US012637955B2

(12) United States Patent
Bidkar et al.

(10) Patent No.: US 12,637,955 B2
(45) Date of Patent: May 26, 2026

(54) FLOATING SEAL ASSEMBLY FOR A TURBINE ENGINE

(71) Applicant: GENERAL ELECTRIC COMPANY, Evendale, OH (US)

(72) Inventors: Rahul Anil Bidkar, Clifton Park, NY (US); Steven Douglas Johnson, Milford, OH (US); Uttara Vijay Kumar, Glenville, NY (US); Randy Thomas Antelo, Silverthorne, CO (US); Keith William Gary, Ballston Spa, NY (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 19/055,837

(22) Filed: Feb. 18, 2025

(65) Prior Publication Data

US 2025/0215805 A1 Jul. 3, 2025

Related U.S. Application Data

(63) Continuation of application No. 17/385,331, filed on Jul. 26, 2021, now Pat. No. 12,270,304.

(51) Int. Cl.
*F01D 11/02* (2006.01)

(52) U.S. Cl.
CPC ........ *F01D 11/025* (2013.01); *F05D 2220/32* (2013.01); *F05D 2240/55* (2013.01)

(58) Field of Classification Search
CPC . F01D 11/025; F05D 2220/32; F05D 2240/55
See application file for complete search history.

(56) References Cited

U.S. PATENT DOCUMENTS

| | | | |
|---|---|---|---|
| 5,100,158 | A | 3/1992 | Gardner |
| 5,143,384 | A | 9/1992 | Lipschitz |
| 5,301,957 | A | 4/1994 | Hwang et al. |
| 5,509,664 | A | 4/1996 | Borkiewicz |
| 6,145,843 | A | 11/2000 | Hwang |
| 6,505,837 | B1 | 1/2003 | Heshmat |
| 6,572,115 | B1 | 6/2003 | Sarshar |
| 6,655,696 | B1 | 12/2003 | Fang |

(Continued)

FOREIGN PATENT DOCUMENTS

| | | | |
|---|---|---|---|
| CN | 110017211 | A | 7/2019 |
| CN | 112302730 | A | 2/2021 |

(Continued)

OTHER PUBLICATIONS

Grondahl et al., "Film Riding Leaf Seals for Improved Shaft Sealing", Proceeding of ASME Turbo Expo 2010: Power for Land, Sea and Air, Jun. 14-18, 2010, 8 pages, Glasgow, UK.

(Continued)

*Primary Examiner* — Nathaniel E Wiehe
*Assistant Examiner* — Theodore C Ribadeneyra
(74) *Attorney, Agent, or Firm* — Dority & Manning, P.A.

(57) ABSTRACT

A floating seal assembly for a turbine engine. The floating seal assembly has a carriage assembly, a seal body, a seal face, a pressurization cavity, and an internal passage. The carriage assembly defines a seal seat with a seal cavity. The seal body floats within the seal cavity. The seal face is located between the seal body and a first wall of the carriage assembly. The pressurization cavity is located along the seal face.

20 Claims, 19 Drawing Sheets

(56) References Cited

U.S. PATENT DOCUMENTS

| | | | |
|---|---|---|---|
| 6,692,006 | B2 | 2/2004 | Holder |
| 6,811,154 | B2 | 11/2004 | Proctor et al. |
| 7,726,660 | B2 | 6/2010 | Datta |
| 7,914,007 | B2 | 3/2011 | Berard |
| 8,002,285 | B2 | 8/2011 | Justak |
| 8,056,902 | B2 | 11/2011 | Roddis et al. |
| 8,641,045 | B2 | 2/2014 | Justak |
| 9,045,994 | B2 | 6/2015 | Bidkar et al. |
| 9,115,810 | B2 | 8/2015 | Bidkar et al. |
| 9,145,785 | B2 | 9/2015 | Bidkar et al. |
| 9,255,642 | B2 | 2/2016 | Bidkar et al. |
| 9,359,908 | B2 | 6/2016 | Bidkar et al. |
| 9,587,746 | B2 | 3/2017 | Bidkar et al. |
| 10,060,280 | B2 | 8/2018 | Crawley, Jr. et al. |
| 10,161,259 | B2 | 12/2018 | Gibson et al. |
| 10,190,431 | B2 | 1/2019 | Bidkar et al. |
| 10,352,455 | B2 | 7/2019 | Berard et al. |
| 10,443,424 | B2 | 10/2019 | McCaffrey |
| 10,539,034 | B2 | 1/2020 | Miller |
| 10,781,709 | B2 | 9/2020 | Sen |
| 11,028,712 | B2 | 6/2021 | Tyler |
| 2007/0053772 | A1 | 3/2007 | Couture |
| 2008/0056895 | A1 | 3/2008 | Senoo |
| 2012/0223483 | A1 | 9/2012 | Bidkar |
| 2014/0008871 | A1 | 1/2014 | Bidkar |
| 2014/0062024 | A1 | 3/2014 | Bidkar |
| 2015/0159498 | A1 | 6/2015 | Mukhopadhyay |
| 2016/0010480 | A1 | 1/2016 | Bidkar |
| 2016/0097291 | A1 | 4/2016 | Hayford |
| 2016/0130963 | A1 | 5/2016 | Wilson |
| 2016/0138412 | A1 | 5/2016 | Rioux |
| 2016/0281531 | A1 | 9/2016 | Dube |
| 2016/0376907 | A1 | 12/2016 | O'Leary |
| 2017/0051621 | A1 | 2/2017 | Ackermann |
| 2017/0370474 | A1 | 12/2017 | Berard et al. |
| 2018/0372229 | A1 | 12/2018 | Bidkar |
| 2019/0072186 | A1 | 3/2019 | Bidkar et al. |
| 2019/0085712 | A1 | 3/2019 | Wesling |
| 2019/0203842 | A1 | 7/2019 | Bidkar et al. |
| 2019/0218927 | A1 | 7/2019 | DiFranesco |
| 2020/0040735 | A1 | 2/2020 | Millier et al. |
| 2020/0063588 | A1 | 2/2020 | Morliere et al. |
| 2020/0318489 | A1 | 10/2020 | Webb |
| 2021/0087939 | A1 | 3/2021 | D'Ettole |
| 2022/0235667 | A1 | 7/2022 | Mizumi |

FOREIGN PATENT DOCUMENTS

| | | | |
|---|---|---|---|
| EP | 1707751 | B1 | 11/2015 |
| EP | 3263842 | B1 | 9/2019 |
| EP | 3234419 | B1 | 4/2020 |
| EP | 3715587 | A1 | 9/2020 |
| WO | 2016100636 | A1 | 6/2016 |

OTHER PUBLICATIONS

Munson et al., "Development of Film Riding Face Seals for a Gas Turbine Engine", Tribology Transactions, 35:1. 65-70, DOI: 10.1080/10402009208982090, Published Mar. 25, 2008, 7 pages, vol. 35 (1992).

Steinetz et al., "Advanced Seal Technology Role in Meeting Next Generation Turbine Engine Goals", RTO AVT Symposium on "Design Principles and Methods for Aircraft Gas Turbine Engines", 14 pages, May 11-15, 1998, Toulouse France.

FLOATING SEAL ASSEMBLY FOR A TURBINE ENGINE

CROSS-REFERENCE TO RELATED APPLICATION(S)

This application is a continuation of U.S. patent application Ser. No. 17/385,331, filed Jul. 26, 2021, now allowed, which is incorporated herein by reference in their entirety.

STATEMENT REGARDING FEDERALLY SPONSORED RESEARCH OR DEVELOPMENT

This invention was made with government support under contract number DE-FE0024007 awarded by the U.S. Department of Energy. The government has certain rights in the invention.

TECHNICAL FIELD

The disclosure generally relates to a floating seal assembly, and more specifically to a floating seal assembly for a turbine engine.

BACKGROUND

Turbine engines, and particularly gas turbine engines, are rotary engines that extract energy from a flow of working air passing serially through a compressor section, where the working air is compressed, a combustor section, where fuel is added to the working air and ignited, and a turbine section, where the combusted working air is expanded and work taken from the working air to drive the compressor section along with other systems, and provide thrust in an aircraft implementation. The compressor and turbine stages comprise axially arranged pairs of rotating blades and stationary vanes. The gas turbine engine can be arranged as an engine core comprising at least a compressor section, a combustor section, and a turbine section in axial flow arrangement and defining at least one rotating element or rotor and at least one stationary component or stator. A seal assembly, specifically a labyrinth seal assembly, can be located between the stator and the rotor and be used to reduce leakage fluids between the rotor and stator. In a bypass turbofan implementation, an annual bypass air flow passage is formed about the core, with a fan section located axially upstream of the compressor section.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
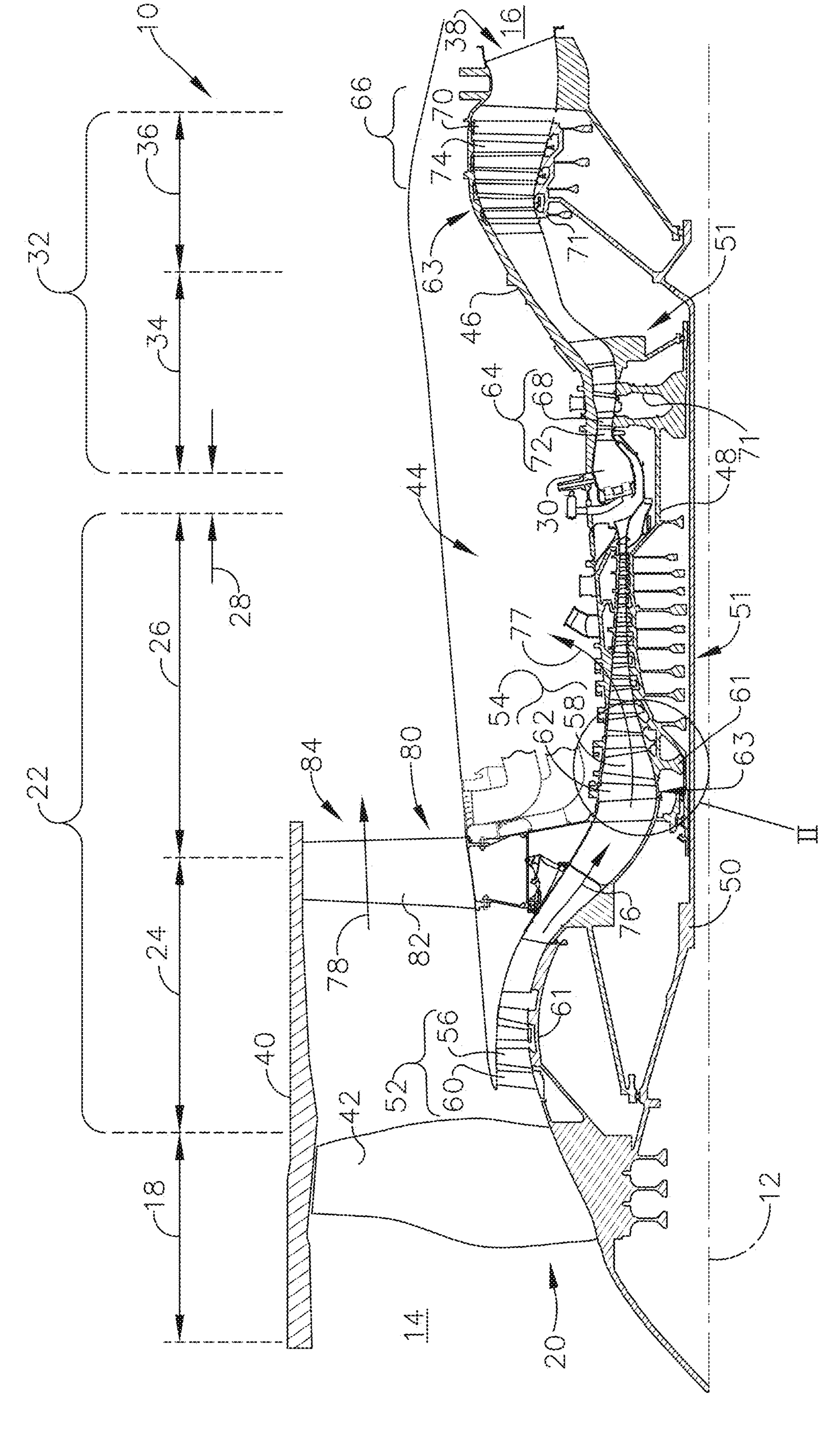
FIG. 1 is a schematic cross-sectional view of a gas turbine engine for an aircraft.

Aspects of the disclosure described herein are broadly directed to a floating seal assembly having a carriage assembly at least partially defining a seal seat and a seal cavity, and a seal body within the seal cavity. The seal body can confront at least a portion of a rotor of the gas turbine engine. As a non-limiting example, the floating seal assembly can include a seal face located between the seal body and a first wall of the carriage assembly can be provided. The seal face can be connected to one of either the seal body or the first wall via a pivot connection. With this configuration, the seal body can rotate about the pivot connection and follow the axial, radial, and circumferential movement of the rotor. As a non-limiting example, the floating seal assembly can include a seal provided between the seal body and a second wall of the carriage assembly. The seal can be biased against at least one of the second wall or the seal body and limit an ingress of a leakage fluid into the seal cavity. It is contemplated that the seal body can be positioned between any suitable portion of a stator and a rotor such that the first wall is exposed to a lower-pressure area, while the second wall, at least a portion of the seal body, and the seal is exposed to a higher-pressure area. As a non-limiting example, the seal body can be positioned within a turbine section of the gas turbine engine such that the first wall is downstream the seal body, the first wall, and the seal.

The floating seal assembly can provide for a dynamic sealing environment through use of the pivot connection and the seal face, and the seal. For the purposes of illustration, one exemplary environment within which the floating seal assembly can be utilized will be described in the form of a turbine engine. Such a turbine engine can be in the form of a gas turbine engine, a turboprop, turboshaft or a turbofan engine having a power gearbox, in non-limiting examples. It will be understood, however, that aspects of the disclosure described herein are not so limited and can have general applicability within other sealing systems. For example, the disclosure can have applicability for a floating seal assembly in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Further yet, as used herein, the term "fluid" or iterations thereof can refer to any suitable fluid within the gas turbine engine at least a portion of the gas turbine engine is exposed to such as, but not limited to, combustion gases, ambient air, pressurized airflow, working airflow, or any combination thereof. It is yet further contemplated that the gas turbine engine can be other suitable turbine engine such as, but not limited to, a steam turbine engine or a supercritical carbon dioxide turbine engine. As a non-limiting example, the term "fluid" can refer to steam in a steam turbine engine, or to carbon dioxide in a supercritical carbon dioxide turbine engine.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a turbine engine, specifically a gas turbine engine 10 for an aircraft. The gas turbine engine 10 has a generally longitudinally extending axis or engine centerline 12 extending forward 14 to aft 16. The gas turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38. The gas turbine engine 10 as described herein is meant as a non-limiting example, and other architectures are possible, such as, but not limited to, the steam turbine engine, the supercritical carbon dioxide turbine engine, or any other suitable turbine engine The fan section 18 includes a fan casing 40 surrounding the fan 20. The fan 20 includes a set of fan blades 42 disposed radially about the engine centerline 12. The HP compressor 26, the combustor 30, and the HP turbine 34 form an engine core 44 of the gas turbine engine 10, which generates combustion gases. The engine core 44 is surrounded by core casing 46, which can be coupled with the fan casing 40.

A HP shaft or spool 48 disposed coaxially about the engine centerline 12 of the gas turbine engine 10 drivingly connects the HP turbine 34 to the HP compressor 26. A LP shaft or spool 50, which is disposed coaxially about the engine centerline 12 of the gas turbine engine 10 within the larger diameter annular HP spool 48, drivingly connects the LP turbine 36 to the LP compressor 24 and fan 20. The spools 48, 50 are rotatable about the engine centerline 12 and couple to a set of rotatable elements, which can collectively define a rotor 51.

The LP compressor 24 and the HP compressor 26 respectively include a set of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The compressor vanes 60, 62 for a stage of the compressor can be mounted to the core casing 46 in a circumferential arrangement.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50, with each stage having a dedicated disk 71. The turbine vanes 72, 74 for a stage of the compressor can be mounted to the core casing 46 in a circumferential arrangement.

Complementary to the rotor portion, the stationary portions of the gas turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the gas turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the gas turbine engine 10 via the exhaust section 38. The driving of the LP turbine 36 drives the LP spool 50 to rotate the fan 20 and the LP compressor 24. The pressurized airflow 76 and the combustion gases can together define a working airflow that flows through the fan section 18, compressor section 22, combustor section 28, and turbine section 32 of the gas turbine engine 10.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the gas turbine engine 10 through a stationary vane row, and more particularly an outlet guide vane assembly 80, comprising a set of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the gas turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
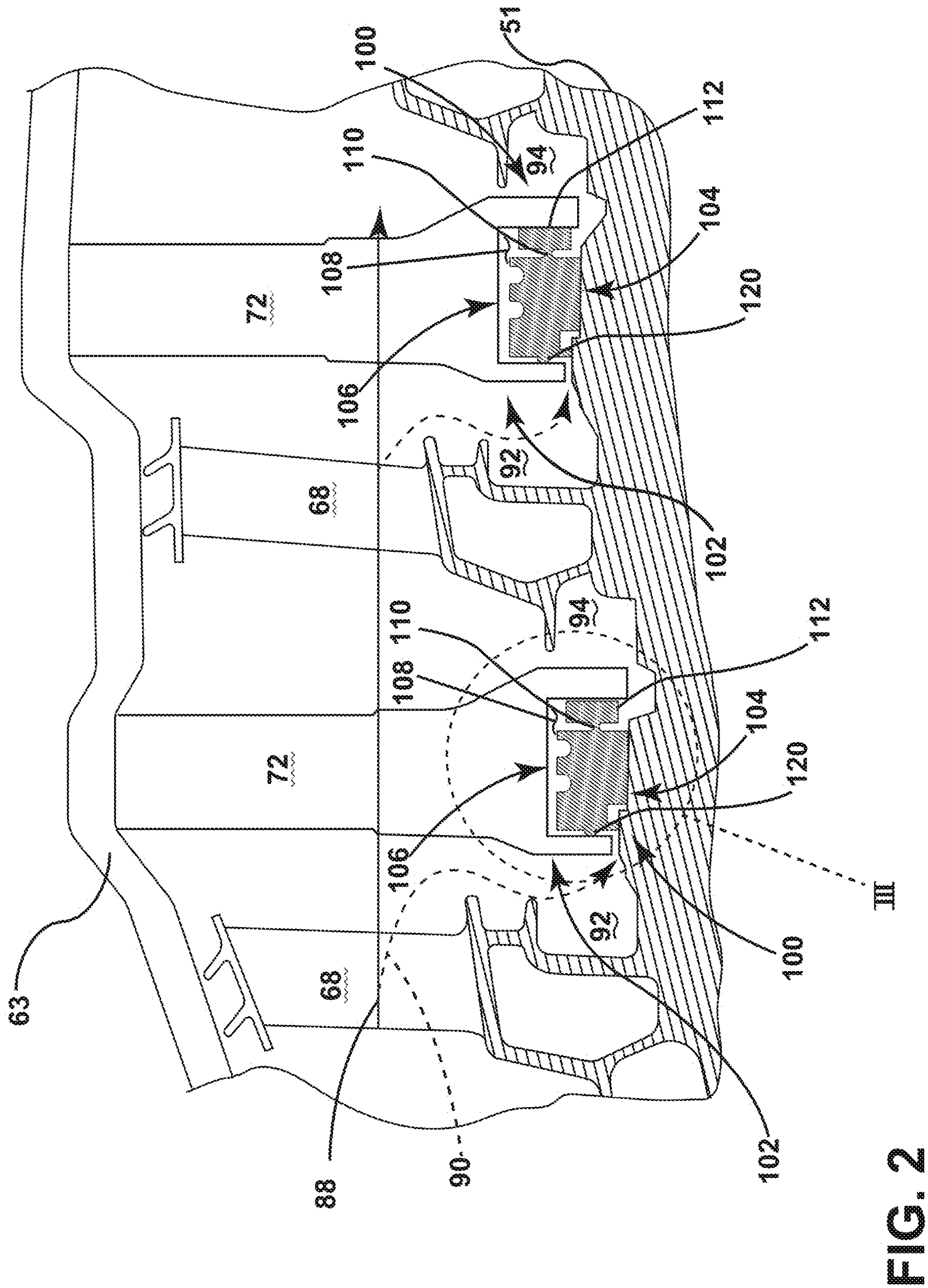
FIG. 2 is a schematic cross-sectional view of the gas turbine engine of FIG. 1, further including a rotor and a stator with a floating seal assembly disposed therebetween.

FIG. 2 further illustrates the rotor 51, the stator 63, and a floating seal assembly 100 for the gas turbine engine 10 as seen from section II of FIG. 1. In the example shown, at least a portion of the floating seal assembly 100 can be provided in the HP turbine 32 (FIG. 1) and depend from a portion of the stator 63, specifically from the turbine vanes 72 that extend from the outer portions of the stator 63 and located between two adjacent turbine blades 68. It will be appreciated, however, that the floating seal assembly 100 can be positioned between any suitable rotating and stationary component of the gas turbine engine 10 within any portion of the gas turbine engine 10 such as, for example, in the fan section 18, the compressor section 22, or the turbine section 32 (FIG. 1). As such, the floating seal assembly 100 can depend from any suitable stationary component such as, but not limited to, the compressor vanes 60, 62, or the turbine vanes 72, 74. For purposes of this disclosure, the turbine vane 72, or any other vane (e.g., the static vanes 60, 62, 74), which depends form the stator 63 can be collectively referred to as the stator 63.

The floating seal assembly 100 can include a carriage assembly 102 carried by the stator 63 and having a seal seat 106 defining a seal cavity 108. The floating seal assembly 100 can further include a seal body 104 at least partially located within the seal cavity 108. A seal face 112 and a pivot connection 110 can be provided between the seal body 104 and the carriage assembly 102. A seal 120 can be provided between the seal body 104 and the carriage assembly 102. The seal 120 can be configured to limit, restrict or otherwise stop the ingress of fluid between a portion o the seal body 104 and the carriage assembly 102 and into the seal cavity 108.

During operation of the gas turbine engine 10, a working fluid 88 can flow over the turbine blades 68 and turbine vanes 72. In the specific example, the working fluid 88 can be defined by the pressurized airflow 76 (FIG. 1), however, it will be appreciated that he working fluid 88 can be any suitable working fluid or airflow such as, but not limited to, the pressurized airflow 76, combustion gases, an ambient airflow, any combination thereof, or any other suitable fluid as described herein. The majority of the working fluid 88 can flow over the turbine vanes 72 and the turbine blades 68 to define a working fluid path. A leakage fluid 90 diverges from the working fluid 88 and enters the space between the compressor blade 58 and the compressor vane 62 (FIG. 1), and flows between a radially inner portion of the stator 63 (e.g., the radially inner portions of the turbine vanes 72) and the rotor 51. Further yet, specific portions of the gas turbine engine 10 can be defined by various pressure differentials. As a non-limiting example, one side of the floating seal assembly 100 (e.g., in this case, axially forward or upstream of the floating seal assembly 100) can be defined by a first pressure 92 while other portions (e.g., in this case, axially aft or downstream of the floating seal assembly 100) can be defined by a second pressure 94. The first pressure 92 can be higher than the second pressure 94, thus defining the pressure differential across the floating seal assembly 100.

The floating seal assembly 100 can reduce or otherwise eliminate the amount of leakage fluid 90 that flows from an upstream portion of the turbine vane 72 exposed to the first pressure 92 to a downstream portion of the turbine vane 72 exposed to the second pressure 94. This is done by establishing a labyrinth between the stator 63 and the rotor 51. In other words, the floating seal assembly 100 can create a torturous path for the leakage fluid 90, thus either reducing or eliminating the amount of leakage fluid 90 that is able to flow around the radially inner portion of the stator 63.

Figure 3A:
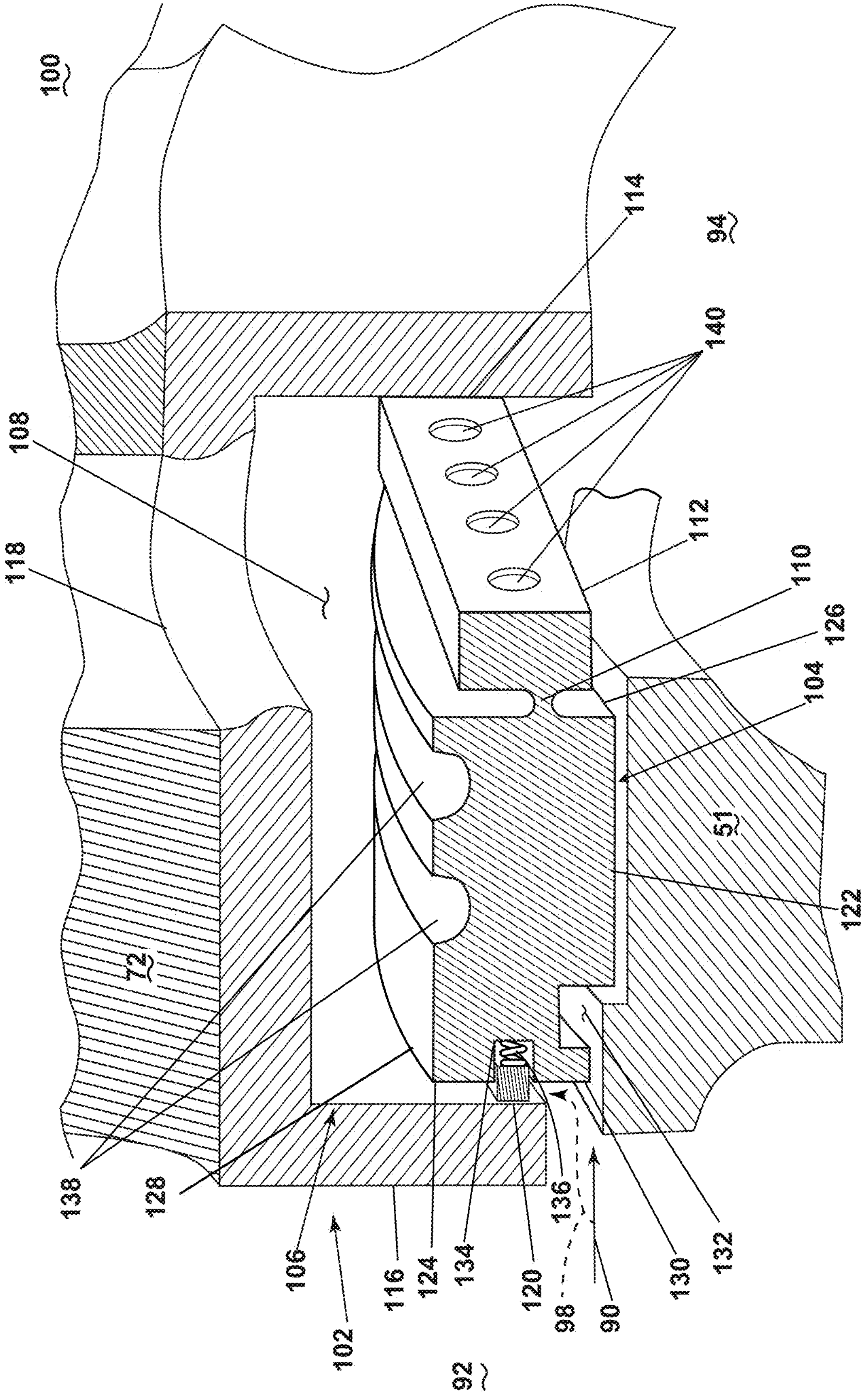
FIG. 3A is an enlarged schematic perspective of the floating seal assembly of FIG. 2, further including a carriage assembly, a seal body, a seal face, a pivot connection, and a seal in a first position with respect to the rotor.
Figure 3B:
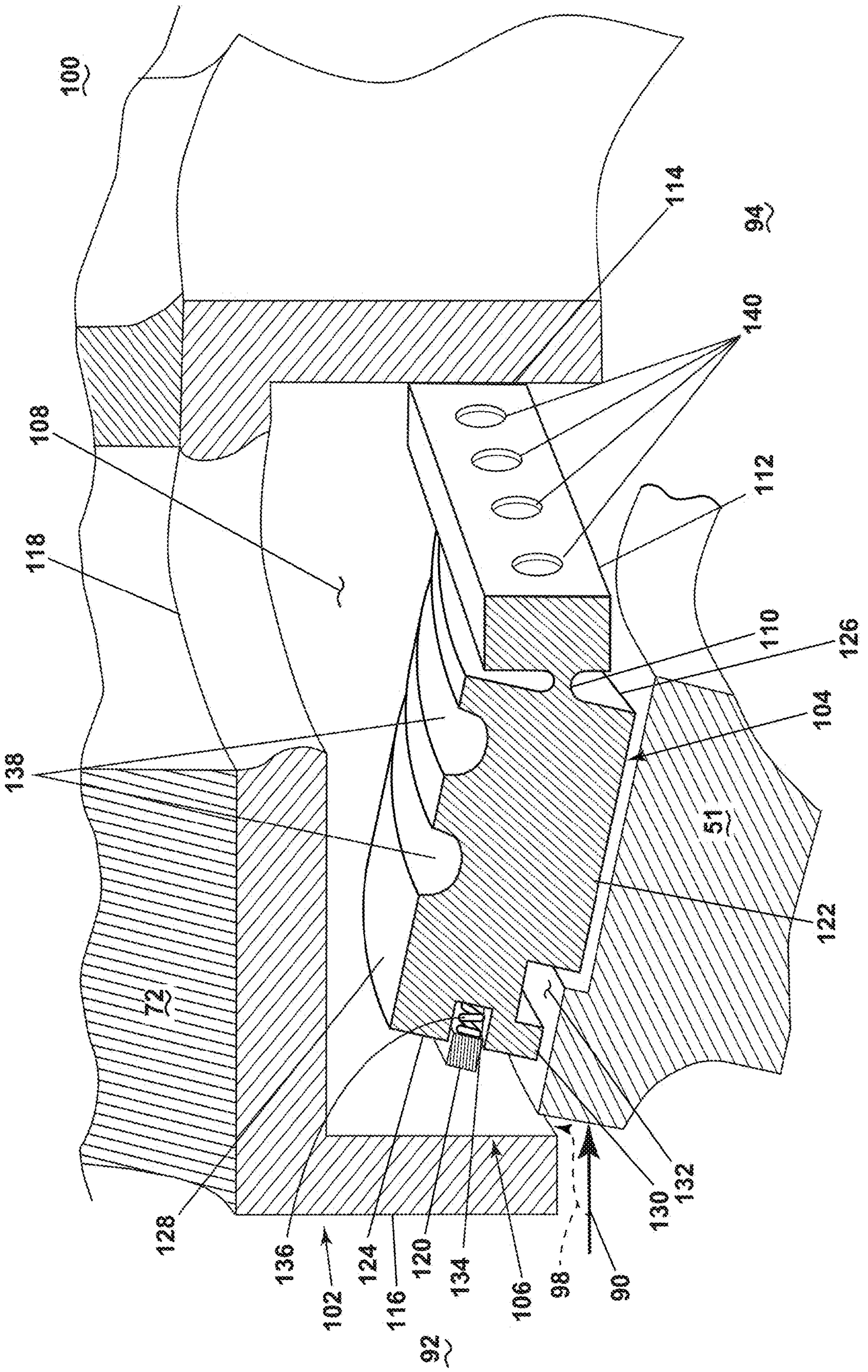
FIG. 3B is an enlarged schematic perspective of the floating seal assembly of FIG. 2, further including a carriage assembly, a seal body, a seal face, a pivot connection, and a seal in a second position with respect to the rotor.

FIGS. 3A-3B are schematic perspective illustrations of the floating seal assembly 100 in a first position (FIG. 3A) and a second position (FIG. 3B) as seen from enlarged area III of FIG. 2. As illustrated, the difference between the first position and the second position of the floating seal assembly 100 is that the seal body 104 is pivoted in the axial direction with respect to the pivot connection 110. Further yet, the seal 120 can be provided between the seal body 104 and the carriage assembly 102, and engage a portion for the carriage assembly 102. As such, FIGS. 3A-3B illustrate a comparison of the floating seal assembly 100 between the first position and the second position, respectively.

The carriage assembly 102 of the floating seal assembly 100 can define the seal seat 106 defining the seal cavity 108. The seal seat 106 can take on many physical shapes, but, as illustrated, the seal seat 106 includes a first wall 114, a second wall 116, and a third wall 118. Both the first wall 114 and the second wall 116 can extend radially inwardly from the stator 63, specifically the turbine vane 72. The first wall 114 can be exposed to the lower, second pressure 94, while the second wall 116 can be exposed to the higher, first pressure 92. As a non-limiting example, the second wall 116 can be upstream or axially forward the first wall 114. The third wall 118 can extend in the axial direction and interconnect the first wall 114 and the second wall 116. Together, the first wall 114, the second wall 116, and the third wall 118 can define the seal seat 106 and hence the seal cavity 108. It will be appreciated that the first wall 114, the second wall 116, and the third wall 118, and hence the seal seat 106, can be sized such that the seal body 104 can be at least partially received within the seal cavity 108. The first wall 114 and the second wall 116 together define a radial seal guide for the seal body 104. In other words, the seal body 104 can be free to move in the radial direction within the seal cavity 108 demarcated by the first wall 114 and the second wall 116.

As illustrated, the carriage assembly 102 is formed as a monolithic structure with the stator 63 (e.g., the turbine vane 72). As a non-limiting example, at least a portion of the stator 63 and the carriage assembly 102 can be formed through any suitable manufacturing method to form a monolithic body such as, but not limited to, additive manufacturing, casting, or the like. It will be appreciated, however, that the carriage assembly 102 can be formed as a discrete, separate component that is coupled to the stator 63. The coupling can be done through any suitable method such as, but not limited to, welding, fastening, adhesion, or any combination thereof.

It is contemplated that that the seal seat 106 can include any portion of the carriage assembly, which as illustrated can be any number of one or more walls. As a non-limiting example, at least one of the first wall 114, the second wall 116, or the third wall 118 can be excluded from the carriage assembly 102. As a non-limiting example, the floating seal assembly 100 can be defined as a Compressor Discharge Pressure (CDP) seal assembly. In such a case, the second wall 116 can be excluded such that the seal seat 106 is defined at least by the first wall 114 extending radially inward toward the rotor 51 at a downstream portion of the seal body 104, and the third wall 118 extending upstream or forward the second wall 116.

The seal body 104 can include a first seal body face 122 confronting the rotor 51, a second seal body face 124 confronting the second wall 116 of the carriage assembly 102, a third seal body face 126 opposite the second seal body face 124 and confronting the first wall 114, and a fourth seal body face 128 opposite the first seal body face 122 and confronting a portion of the seal cavity 108. The second seal body face 124 can be at least partially exposed to the first pressure 92. In other words, the first seal body face 122 can define a radially inner face of the seal body 104, the second seal body face 124 can define a face confronting the first pressure 92 or otherwise an axially forward or upstream face of the seal body 104 (e.g., the face confronting at least a portion of the leakage fluid 90 and exposed to the first pressure 92), the third seal body face 126 can define an axially aft or downstream face of the seal body 104 (e.g., at least partially exposed to the second pressure 94), and the fourth seal body face 128 can define a radially outer face of the seal body 104.

The seal body 104 can further include a tooth 130 extending radially inward from the seal body 104 and confronting the rotor 51. As a non-limiting example, the tooth 130 can define at least a portion of the first seal body face 122. The tooth 130 can be exposed to the leakage fluid 90, and hence the first pressure 92. A cavity 132 can be formed on the side of the tooth 130 opposite the first pressure 92. As a non-liming example, the cavity 132 be formed aft of the tooth 130 between the first seal body face 122 and the rotor 51. The tooth 130 can provide sealing (e.g., can reduce an amount of a leakage of fluid) between the seal body 104 and the rotor 51 to ensure the leakage fluid 90 does not flow around the radially inner portions of the seal body 104 during operation of the gas turbine engine 10. The tooth 130 can be in the form of a protrusion from the seal body 104. Both the tooth 130 and the cavity 132 can extend along the circumferential extent of the seal body 104.

The first seal body face 122 can further include aerodynamic lift-generation features (not illustrated) such as, but not limited to, a spiral groove, a Rayleigh pad, or otherwise include a curvature mismatch between the seal body 104 and a radius of the rotor 51. The aerodynamic lift-generation features can generate a first film of fluid between the first seal body face 122 and the rotor 51. The first seal body face 122 (e.g., aerodynamic lift-generation features on the first seal body face 122) can be non-uniform along the axial extent of the seal body 204. The first film of fluid can generate a lift force between the rotor 51 and the seal body 104 such that seal body 104 can float on the rotor 51 without rubbing, touching, or otherwise contacting the rotor 51.

A set of grooves 138 can be formed within a portion of the seal body 104 and extend circumferentially about the seal body 104. As a non-limiting example, the set of grooves 138 can be formed within a portion of the fourth seal body face 128 confronting the seal cavity 108. The set of grooves 138 can include a set of biasing elements (not illustrated) corresponding to the set of grooves. As a non-limiting example, the set of biasing elements corresponding to the set of grooves can include, but are not limited to, a garter spring, a leaf spring, or a coil spring. The biasing elements can urge the seal body 104 toward the rotor 51. As such, the biasing elements and the set of grooves 138 can, together, be defined as a biasing element that urges the seal body 104 radially inward, with respect to the engine centerline 12, and against the rotor 51. As illustrated, the groove 138 can extend into a portion of the seal body 104 and is formed as a channel within the seal body 104. It will be appreciated, however, that the grooves 138 can be formed within a protrusion extending from the seal body 104 and into the seal cavity 108.

A seal groove 134 can be formed within a portion of the seal body 104 and extend circumferentially about the seal body 104. As a non-limiting example, the seal groove 134 can confront the second wall 116 and define a portion of the third seal body face 126. As illustrated, the seal groove 134 can extend into the seal body 104. It will be appreciated, however, that the seal groove 134 can be formed as a protrusion extending between the seal body 104 and the carriage assembly 102.

The seal 120 can be located between seal body 104 and the carriage assembly 102. As a non-limiting example, the seal 120 can be located between the second seal body face 124 and the second wall 116 of the carriage assembly 102. The seal 120 can further be at least partially provided within the seal groove 134. The seal 120 can span the entirety of a gap formed between the second seal body face 124 and the second wall 116. It is contemplated that the seal 120 can be any suitable seal such as, but not limited to, a piston ring, a segmented piston ring, a piston bar, a leaf seal, a spline seal, a W-seal, an E-seal, a C-seal, or any combination thereof. The seal 120 can be designed to provide a minimal radial frictional load on the seal body 104, while still ensuring that fluid is limited or otherwise stopped form flowing around the seal body 104 and into the seal cavity 108.

The seal 120 can further include a biasing element 136 provided within the seal groove 134. As a non-limiting example, the biasing element 136 can bias the seal 120 against the second wall 116 of the carriage assembly 102. The biasing element 136 can be any suitable biasing element such as, but not limited to, a torsional spring, a leaf spring, a compression spring, a wave spring or any combination thereof. The biasing element 136, the seal 120, and the seal groove 134 can, together, be defined as a fluid seal assembly to control against, or otherwise stop or reduce the ingress of fluid into the seal cavity 108.

The floating seal assembly 100 can further include the seal face 112 located between the seal body 104 and the carriage assembly 102. As a non-limiting example, the seal face 112 can be located between the third seal body face 126 and the first wall 114 of the carriage assembly 102. The seal face 112 can extend circumferentially along the seal body 104 and the carriage assembly 102. The seal face 112 can further be defined as a body extending between the carriage assembly 102 and the seal body 104.

The seal face 112 can be at least partially defined by a set of fluid cavities 140. As illustrated, the set of fluid cavities 140 can be formed as cylindrical cavities extending into a portion of the seal face 112. The set of fluid cavities 140 can be circumferentially spaced with respect to one another and span along the circumferential extent of the seal face 112. It will be appreciated that there can be any number of fluid cavities 140 formed as any suitable shape such as, but not limited to, rectangular, ovular, or any other suitable polygonal shape. As illustrated, the set of fluid cavities 140 confront the first wall 114 of the carriage assembly 102.

The pivot connection 110 can extend from a portion of the seal face 112 opposite the set of fluid cavities 140. As a non-limiting example, the pivot connection 110 can be located between the seal face 112 and the seal body 104. As a non-limiting example, the pivot connection 110 can operatively couple the seal face 112 to the seal body 104. The coupling can be done through any suitable method such as, but not limited to, welding, adhesion, fastening, or the like. As a non-limiting example, at least one of the pivot connection 110 and the seal face 112 can be integrally formed with the seal body 104 such that the pivot connection 110, the seal face 112, and the seal body 104 can be formed as a monolithic structure. As such, the pivot connection 110, the seal face 112, and the seal body 104 can be formed through any suitable manufacturing method to form a monolithic body such as, but not limited to, additive manufacturing, casting, or the like. Further yet, the pivot connection 110 and the seal face 112 can be formed as the same material as the seal body 104.

The pivot connection 110 can extend across at least a portion of the seal face 112. As a non-limiting example, the pivot connection 110 can be formed as a continuous pivot connection 110 that extends circumferentially across the entirety of the seal face 112. Alternatively, the pivot connection 110 can be included within a set of pivot connections 110 that are circumferentially spaced with respect to each other. As a non-limiting example, each pivot connection 110 of the set of pivot connections 110 can be formed as a tab extending from the seal face 112 and toward at least one of the seal body 104 or the carriage assembly 102. In other words, the set of pivot connections 110 can be formed as a set of segmented pivot connections 110. Each pivot connection 110 of the set of segmented pivot connections 110 can be equally sized with respect to one another and equally spaced about the seal face 112 such that a set of gaps is formed between adjacent pivot connections 110. Alternatively, at least one of the segmented pivot connections 110 can be sized larger or smaller than the remainder of the segmented pivot connections 110 such that the gap varies about the circumferential extent of the seal face 112. It will be appreciated that there can be any number of one or more pivot connections 110 per seal face positioned along any portion of the seal face 112. As a non-limiting example, two pivot connections 110 can extend from the seal face 112 at circumferentially distal ends with respect to one another (e.g., the pivot connections 110 can be located at opposite ends of the seal face 112).

As illustrated, the pivot connection 110 can extend from a generally midpoint in the radial direction of the seal face 112. It will be further appreciated, however, that the pivot connection 110 can be located along any portion of the radial extent of the seal face 112. As a non-limiting example, the pivot connection 110 can extend from a radially inner portion of the seal face 112 with respect to the engine centerline 12.

During operation of the gas turbine engine 10, at least a portion of the leakage fluid 90 can flow between the seal body 104 and the carriage assembly 102. At least a portion of the leakage fluid 90 can flow into the seal cavity 108, thus the portion of the leakage fluid 90 that flows between the seal body 104 and the carriage assembly 102 (as illustrated by arrow 98). The engagement of the seal 120 against the carriage assembly 102 can be dependent on the presence and pressure of the leakage fluid 90. As a non-limiting example, at least a portion of the leakage fluid 90 can follow the arrow 98 and ultimately flow into the seal groove 134. With the leakage fluid 90 within the seal groove 134, the seal groove 134 can become pressurized with a fluid defined by the first pressure 92. It is contemplated that the fluid within the seal groove 134 can be enough to urge the seal 120 outward with respect to the seal body 104 such that the seal 120 contacts the carriage assembly 102 (e.g., the second wall 116). As a non-limiting example, the biasing element 136 urges the seal 120 towards carriage assembly 102. As a non-limiting example, the biasing element 136 urges the seal 120 towards the second wall 116 of the carriage assembly 102.

In instances when the fluid pressure in seal groove 134 is not sufficiently high enough to urge the seal 120 toward the carriage assembly 102 (e.g., during start-up processes of the turbine engine 10 when fluid pressures are low), the biasing element 136, alone, can supply a closing force to ensure that the seal 120 is in contact with carriage assembly 102. This, in turn, avoids an indeterminate, open position for the seal 120 in relation to the carriage assembly 102 (e.g., a position where the leakage fluid 90 could flow into the seal cavity 108). In other words, the biasing element 136 provides the closing force for seal 120 during low-pressure scenarios, while the biasing element 136 and the pressure of the leakage fluid 90 within the seal groove 134, together, provide the closing force under high-pressure scenarios (e.g., during operation of the turbine engine 10). This biasing element 136 and fluid pressure configuration that exerts the closing force on the seal 120, can ultimately define the seal 120 as a piston seal. The remaining portion of the leakage fluid 90 can flow around the tooth 130 and into the cavity 132.

The seal 120 and the tooth 130 can limit, or stop the leakage fluid 90 from flowing into the seal cavity 108 and the cavity 132, respectively. It is contemplated, however, that at least a portion of the leakage fluid 90 can flow past the seal 120 and the tooth 130 and into the seal cavity 108 and the cavity 132. The fluid within the seal cavity 108 can have a first cavity pressure which exerts a radially inward force on the seal body 104, while the fluid within the cavity 132 can have a second cavity pressure which exerts a radially outward force on the seal body 104. Both the seal 120 and the tooth 130, however, can generate a pressure drop with respect to the leakage fluid 90 and the first pressure 92, such that the first cavity pressure and the second cavity pressure are both lower than the first pressure 92. The fluid between the first seal body face 122 and the rotor 51 can establish a radially outward force (e.g., an opening force) on the seal body 104. It is contemplated that the pressure of the fluid applying the opening force (e.g., the fluid within the cavity 132) can be counteracted by a closing force generated by the pressure of the fluid within the seal cavity 108. As such the seal body 104 can be held in a dynamic force equilibrium under the action of first and second cavity pressures, the fluid pressure acting on first seal body face 122.

Additional components can be utilized to ensure there is an equilibrium. As an on-limiting example, the set of garter springs within the set of grooves 138 to provide an additional radially inward force. As such, the set of garter springs can provide an additional radially inward force to the radially inward force generated by first cavity pressure to ensure that the radially inward force is sufficient based on the pressure differential and the second cavity pressure.

The rotor 51 can rotate about the engine centerline 12. It is contemplated, however, that during operation of the gas turbine engine 10, the rotor 51 can move in the axial and radial directions. The seal body 104 can follow the axial and radial movement of the rotor 51 by pivoting about the pivot connection 110. In other words, the seal body 104 can move between the first position (FIG. 3A) and the second position (FIG. 3B). In all positions, the seal 120 and the tooth 130 can seal, limit, or stop the ingress of the leakage fluid 90 into the seal cavity 108 and the cavity 132, respectively. As such, the sealing capabilities of the floating seal assembly 100 is maintained as the rotor 51 moves during operation of the gas turbine engine 10.

It is contemplated that that at least a portion of the pivot connection 110 can further be defined by an elastic member biased to the first position (FIG. 3A). As such, when the seal body 104 moves toward the second position (FIG. 3B) through the radial or axial movement of the rotor 51, the pivot connection 110 can bend. Once the rotor 51 has moved back towards the first position (FIG. 3A), the pivot connection 110 can go back to its biased position, thus urging the seal body 104 toward the first position. The pivot connection 110 can also ensure that the seal face 112 remains in contact with or otherwise confronting the first wall 114 of the carriage assembly 102. As a non-limiting example, the pivot connection 110 can ensure that the set of fluid cavities confront the first wall 114 of the carriage assembly 102. Although the pivot connection 110 is illustrated as an elastic member, it will be appreciated that the pivot connection 110 can be formed as any suitable pivot connection 110 biased to, or otherwise capable of moving the seal face 112 between the first position and the second position. As a non-limiting example, the pivot connection 110 can include, but is not limited to, at least one of a mechanical hinge, a living hinge, an elastic member, a lap joint, a bellows, or any combination thereof.

Figure 4:
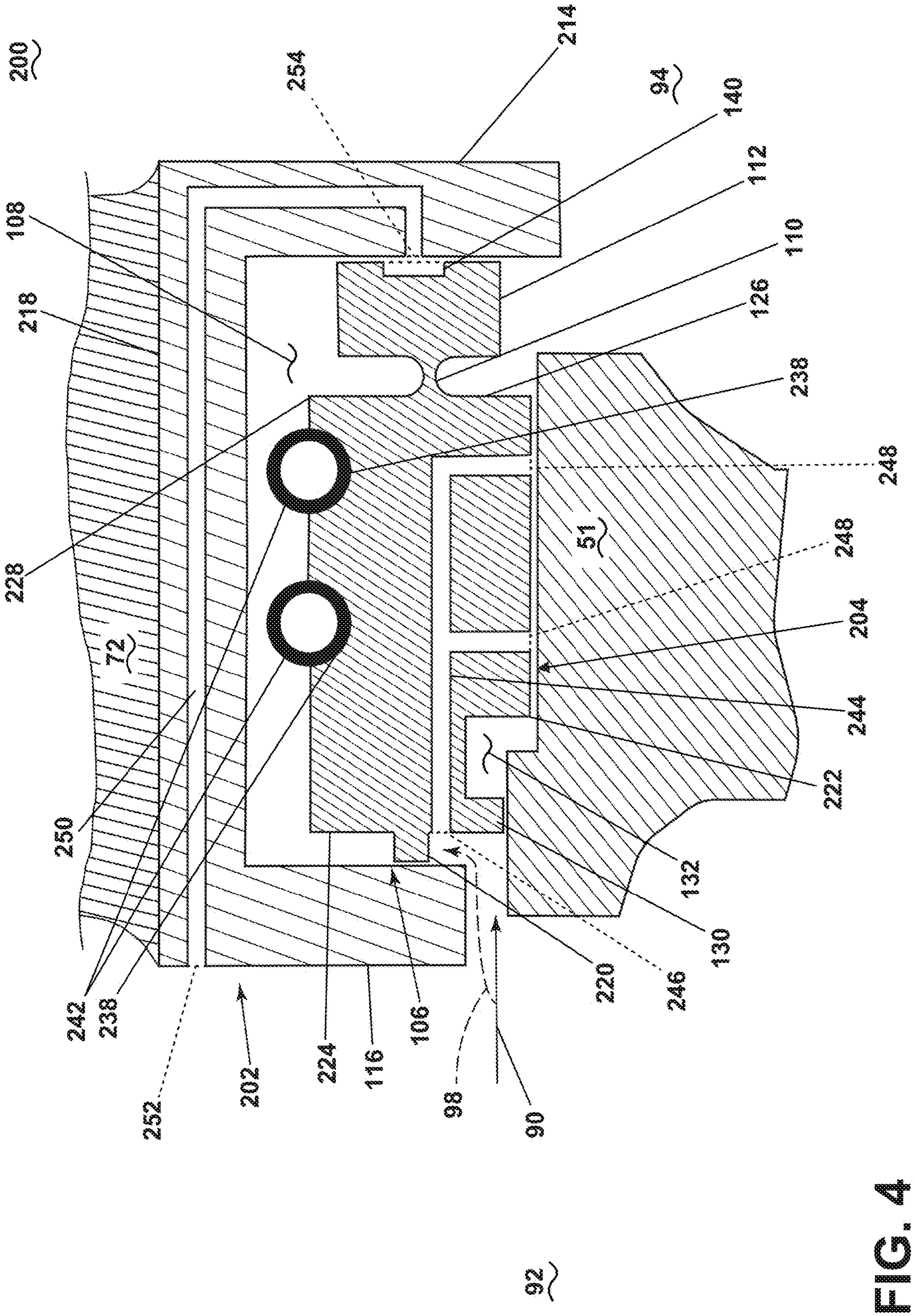
FIG. 4 is an enlarged schematic cross-sectional view an exemplary floating seal assembly of FIG. 2, further including an internal passage located in the body of the carriage assembly.

FIG. 4 is a schematic illustration of a cross-sectional view of an exemplary floating seal assembly 200 of FIG. 2. The exemplary floating seal assembly 200 is similar to the floating seal assembly 100; therefore, like parts will be identified with like numerals in the 200 series, with it being understood that the description of the like parts of the floating seal assembly 100 applies to the exemplary floating seal assembly 200 unless otherwise noted.

The floating seal assembly 200 is similar to the floating seal assembly 100 in that it includes the seal face 112 operably coupled to a seal body 204 through the pivot connection 110. The seal body 204 can be defined by a first seal body face 222, a second seal body face 224, the third seal body face 126, and a fourth seal body face 228. Like the fourth seal body face 128 of the floating seal assembly 100, a set of grooves 238 can be provided along the fourth seal body face 228. As illustrated, a set of garter springs 242 can be provided within the corresponding set of grooves 238. The carriage assembly 202 can include a first wall 214, the second wall 116, and a third wall 218 interconnecting the first wall 214 and the second wall 116.

The floating seal assembly 200 does not include the seal 120 of the floating seal assembly 100. Instead, the floating seal assembly 200 includes a seal tooth 220 extending from the seal body 204 and confronting the second wall 116 of the carriage assembly 202. The seal tooth 220 is formed as a monolithic structure with the seal body 204. Alternatively, the seal tooth 220 can be formed as a portion of the carriage assembly 202. As a non-limiting example, the seal tooth 220 can extend from the second wall 116 and confront the seal body 204. The seal tooth 220 can have similar function to the seal 120 in that it is used to limit, restrict, or stop the ingress of the leakage fluid 90 from passing between the second wall 116 and the seal body 204 and into the seal cavity 108.

A first internal passage 244 can be provided within a portion of the seal body 204. As a non-limiting example, the first internal passage 244 can fluidly couple an inlet 246 located along a second seal body face 224 to a set of outlets 248 located along a first seal body face 222. As illustrated, the set of outlets 248 can confront the rotor 51 such that leakage fluid 90 or air defined by the first pressure 92 can be exhausted toward the rotor 51 through the first internal passage 244.

A second internal passage 250 can be provided within a portion of the carriage assembly 202. As a non-limiting example, the second internal passage 250 can extend through at least a portion of the third wall 218 and the first wall 214. The second internal passage 250 can fluidly couple an inlet 252 to an outlet 254. The inlet 252 can be located on a portion of the carriage assembly 202 exposed to the first pressure 92. As a non-limiting example, the floating seal assembly 200 can be provided within the turbine section 32 such that the inlet 252 can be provided on an upstream portion or face of the carriage assembly 202. The outlet 254 can be located on a portion of the first wall 214 confronting the set of fluid cavities 140 formed within the seal face 112. As such, the second internal passage 250 can fluidly couple the set of fluid cavities 140 to the first pressure 92.

During operation of the gas turbine engine 10, at least a portion of the leakage fluid 90 can flow into the first internal passage 244 through the inlet 246. The leakage fluid 90 can be defined by the first pressure 92. The leakage fluid 90 can subsequently flow through the first internal passage 244 and ultimately out the set of outlets 248. A first film of fluid can be generated by the fluid within the set of internal passages 244 that is exhausted through the set of outlets 248. As such, the first film of fluid can be formed between the rotor 51 and the first seal body face 222 and extend in the axial direction. The first film of fluid can define a region of low-friction or low-resistance such that the seal body 204 can float or slide across portion of the rotor 51 that the first film of fluid is formed on. As such, the seal body 204 can be in floating communication with the rotor 51. The fluid within the first internal passage 244 that flows out of the set of outlets 248 can be used to axially float the seal body 204 along the rotor 51. It will be further appreciated that that the leakage fluid 90 that flows into the cavity 132 can also form at least a portion of the first film of fluid. As such, the cavity 132 can also be used to at least partially axially float the seal body 204.

The second internal passage 250 can fluidly couple the leakage fluid 90 or a fluid defined by the first pressure 92 to the set of fluid cavities 140 of the seal face 112. As such, the set of fluid cavities 140 can be defined as a set of high-pressure fluid cavities. Similar to the relationship between the first cavity pressure within the seal cavity 108 and the second cavity pressure within the cavity 132, the fluid within the set of fluid cavities 140 and the pressure of the leakage fluid that impinges portions of the seal body 204 (e.g., the second seal body face 224) can be in equilibrium. As such, the set of fluid cavities 140 can ensure axial equilibrium across the seal body 204 is obtained, while the cavity 132 and the seal cavity 108 can ensure that radial equilibrium across the seal body 204 is obtained.

The set of fluid cavities 140 can further be used to generate a second film of fluid between the seal face 112 and the first wall 214 of the carriage assembly 202. The second film of fluid can be similar to the first film of fluid, except the second film of fluid can extend in the radial direction. The second film of fluid can define a region of low-friction or low-resistance such that the seal body 204 can float or slide across portion of the carriage assembly 202 that the second film of fluid is formed on. As such, the seal body 204 can be in floating communication with the carriage assembly 202. With the first internal passage 244 and the second internal passage 250, the seal body 204 can axially and radially float along the rotor 51 and the carriage assembly 202.

Figure 5:
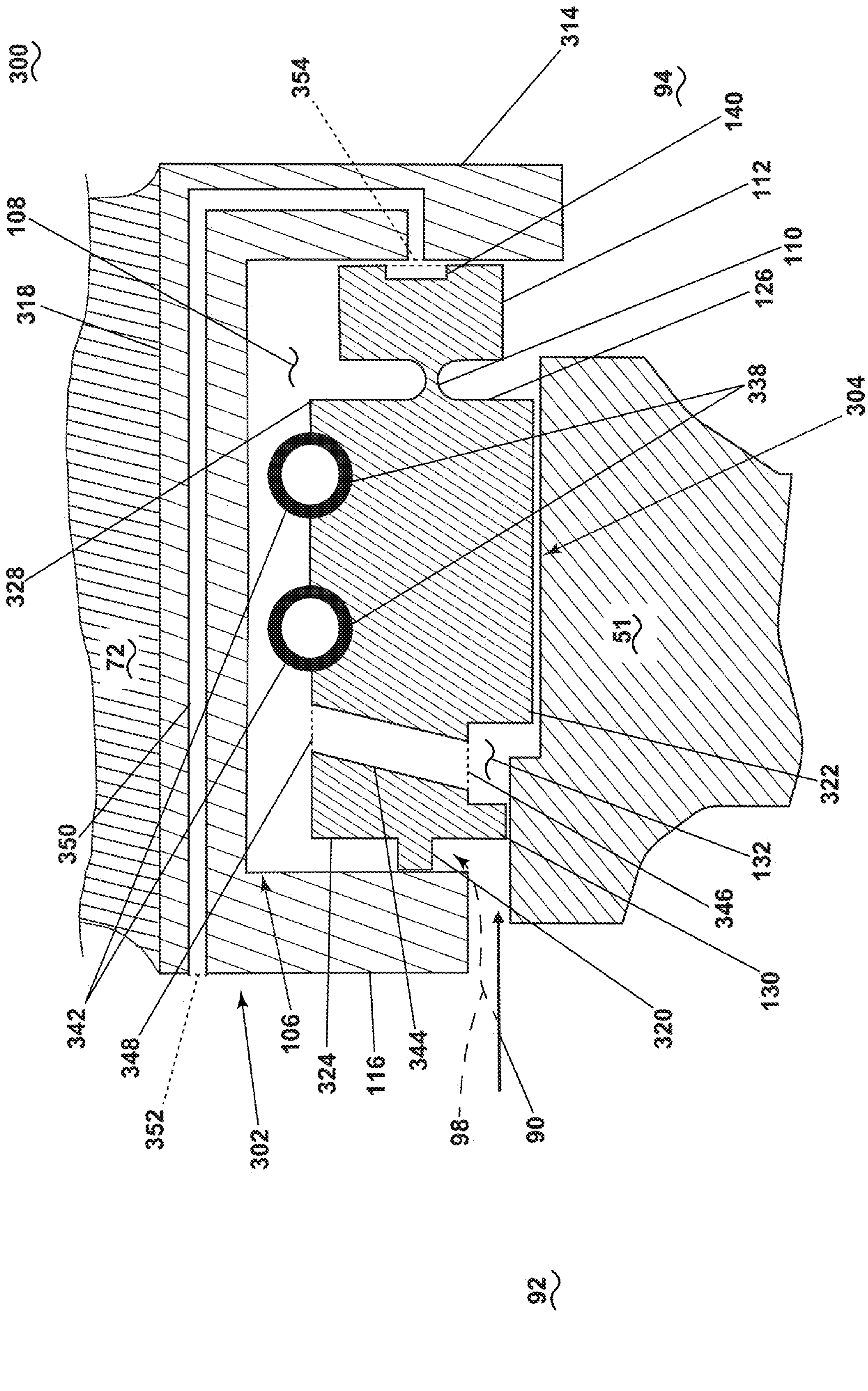
FIG. 5 is an enlarged schematic cross-sectional view an exemplary floating seal assembly of FIG. 2, further including a first internal passage located in the body of the carriage assembly, and a second internal passage within the body of the seal body.

FIG. 5 is a schematic illustration of a cross-sectional view of an exemplary floating seal assembly 300 of FIG. 2. The exemplary floating seal assembly 300 is similar to the floating seal assembly 100, 200; therefore, like parts will be identified with like numerals in the 300 series, with it being understood that the description of the like parts of the floating seal assembly 100, 200 applies to the exemplary floating seal assembly 300 unless otherwise noted.

The floating seal assembly 300 can include a seal body 304 defined by a first seal body face 322, a second seal body face 324, the third seal body face 126, and a fourth seal body face 328. The seal body 304 can further include a first internal passage 344 with a set of inlets 346 and a set of outlets 348. The second seal body face 324 is similar to the second seal body face 224 as it includes a seal tooth 320. The fourth seal body face 328 is similar to the fourth seal body face 228 in that it includes the set of grooves 338 and the set of garter springs 342.

The seal body 304 can further include a carriage assembly 302 similar to the carriage assembly 202 in that it can include a first wall 314, the second wall 116, and a third wall 318 interconnecting the first wall 314 and the second wall 116, with a second internal passage 350 formed within a portion of the first wall 314 and the third wall 318.

The first internal passage 344 can fluidly couple an inlet 346 to an outlet 348. The inlet 346 can located along a portion of the first seal body face 322 and be in fluid communication with the cavity 132. The outlet 348 can be located along a portion of the fourth seal body face 328 and be in fluid communication with the seal cavity 108. As such, the first internal passage 344 can fluidly couple the cavity 132 to the seal cavity 108.

During operation of the gas turbine engine 10, the leakage fluid 90 that flows into the cavity 132 can flow through the inlet 246 or past the primary tooth 130 an into cavity 132. The fluid within the cavity 132 can then flow through the first internal passage 344 and into the seal cavity 108. As such, the fluid within the seal cavity 108 and the fluid within the cavity 132 can be defined to be the same fluid with the same pressure, thus establishing a radial equilibrium across the seal body 304. As such, the portion of the first internal passage 344 that fluidly couples the cavity 132 to the seal cavity 108 can be further defined as an equilibrium passage.

Figure 6:
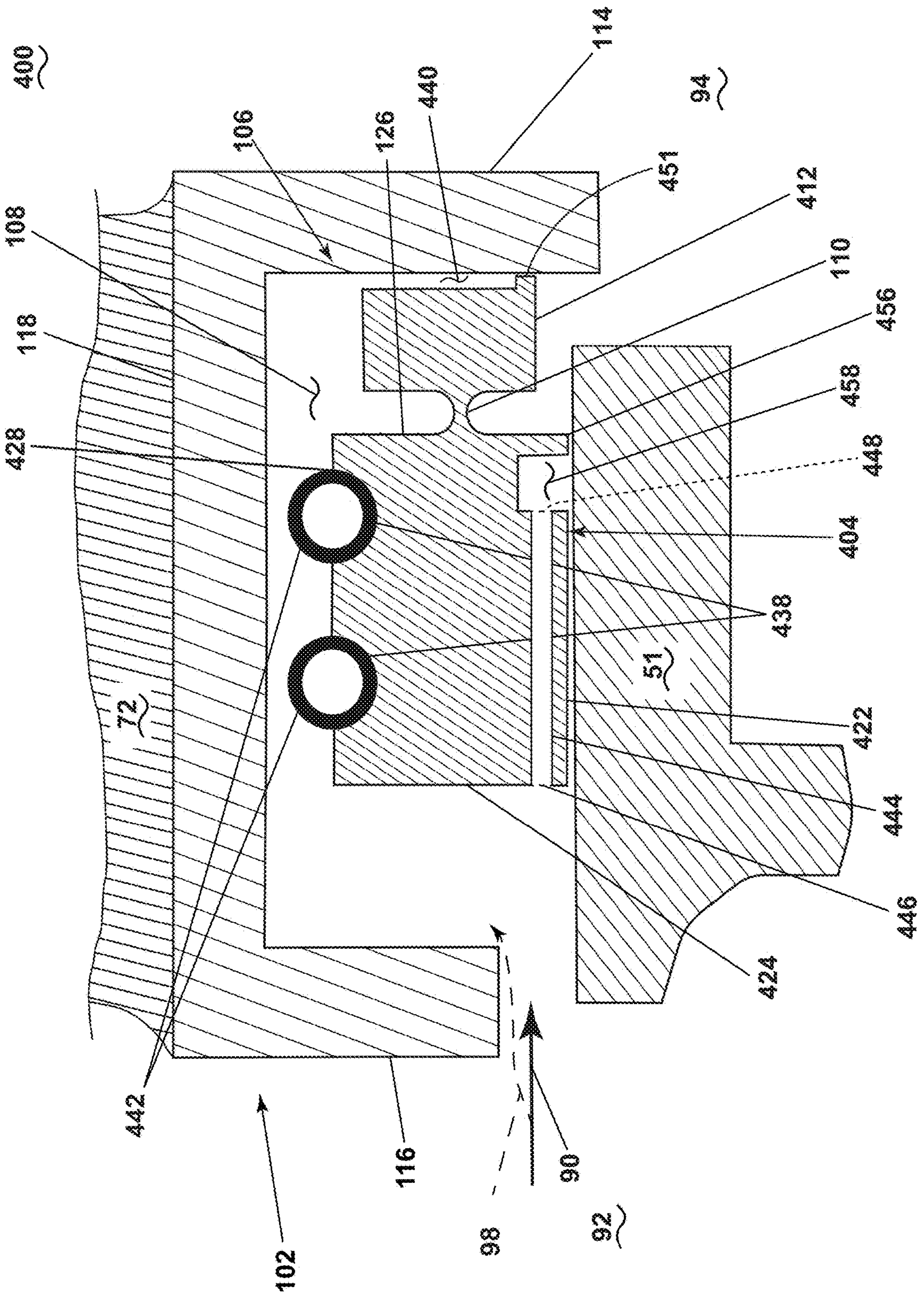
FIG. 6 is an enlarged schematic cross-sectional view an exemplary floating seal assembly of FIG. 2, further including an internal passage within the seal body.

FIG. 6 is a schematic illustration of a cross-sectional view of an exemplary floating seal assembly 400 of FIG. 2. The exemplary floating seal assembly 400 is similar to the floating seal assembly 100, 200, 300; therefore, like parts will be identified with like numerals in the 400 series, with it being understood that the description of the like parts of the floating seal assembly 100, 200, 300 applies to the exemplary floating seal assembly 400 unless otherwise noted.

The floating seal assembly 400 can include a seal body 404 defined by a first seal body face 422, a second seal body face 424, the third seal body face 126, and a fourth seal body face 428. The seal body 404 can further include an internal passage 444 fluidly coupling an inlet 446 to an outlet 448. The fourth seal body face 428 is similar to the fourth seal body face 228, 328 in that it includes the set of grooves 438 and the set of garter springs 442.

The floating seal assembly 400 differs from the floating seal assembly 100, 200, 300, as the seal body 404 does not include a seal (e.g., the seal 120 or seal tooth 220, 320) that contacts the carriage assembly 102 or otherwise spans at least a portion of a gap formed between the seal body 404 and the carriage assembly 102. As a non-limiting example, the second seal body face 424 can confront the second wall 116, however, not physically contact the second wall 116. In other words, the second seal body face 424 is spaced from the second wall 116 such that a gap is formed between the seal body 404 and the carriage assembly 102. As such, a larger portion of the seal cavity 108 can extend between the second seal body face 424 and the carriage assembly when compared to the floating seal assembly 100, 200, 300. It is contemplated that the axial length of the carriage assembly 102 can be adjusted such that the second wall 116 is closer or farther away from the seal body 104 than what is illustrated such that the gap between the seal body 404 and the carriage assembly 102 can be varied.

The seal body 404 can further include a tooth 456 provided on a portion of the seal body 404 exposed to the second pressure 94 and confronting the rotor 51. The tooth 456 can be similar to the tooth 130 of the seal body 204, 304 in that it extends radially inwardly from the seal body 404 and defines a portion of the first seal body face 422. The tooth 456, however, can further define a cavity 458 located on the opposite side of the seal body 404 than the cavity 132 of the seal body 204, 304. The cavity 458 can be similar to the cavity 132 in that it confronts the rotor 51 and can include a portion of the leakage fluid 90 that goes through the pressure drop, as discussed herein. The fluid within the cavity 458 can further contribute to at least a portion the axial floating of the seal body 404. It will be appreciated that at least a portion of the fluid within the cavity 458 can flow around the secondary tooth 456 and aft of the seal body 404. This fluid can otherwise be exhausted to a downstream portion of the gas turbine engine 10 defined by the second pressure 94.

The internal passage 444, like the internal passage 244, can extend axially through the seal body 404 The outlet 448 of the internal passage 444, however, can be provided along a portion of the seal body 404 confronting the cavity 458. As such, the outlet 448 can exhaust into the cavity 458 downstream of the inlet 446. As such, the cavity 458 can be fluidly coupled to at least a portion of the leakage fluid 90.

The floating seal assembly 400 can further include a seal face 412 and the pivot connection 110 operably connecting the seal face 412 to the third seal body face 126 of the seal body 404. The seal face 412 can include a pressurization cavity or channel 440 opposite the pivot connection 110. The pressurization channel 440 can be similar in function to the fluid cavity 140. The pressurization channel 440 can extend radially across at least a portion of the seal face 412. A radially distal or outer portion of the pressurization channel 440 can be exposed to or otherwise opened to the seal cavity 108, while a radially inner portion, opposite the radially outer portion, can terminate at a secondary tooth 451 which extends axially from the seal face 412 and confronts the carriage assembly 102. As a non-limiting example, the secondary tooth 451 can confront the first wall 114 of the carriage assembly 102. The pressurization channel 440 can be included within a set of pressurization channels 440 circumferentially spaced about the seal face 412. Alternatively, the pressurization channel 440 can be formed as a continuous pressurization channel 440.

During operation, at least a portion of the fluid within the seal cavity 108 can flow into the pressurization channel 440. The secondary tooth 451 can check, limit, stop, or otherwise restrict the flow of fluid from within the pressurization channel 440. The fluid within the pressurization channel 440 can act to ensure that equilibrium is obtained between the axially opposed portions of the seal body 404 (e.g., the second seal body face 424 and the third seal body face 126). The fluid within the pressurization channel 440 can further create the second film of fluid as discussed herein. As such, the seal body 404 can axially float through use of the cavity 458 and the internal passage 444, and radially float through use of the pressurization channel 440 of the seal face 412. Further yet, the pressure of the fluid within the cavity 458, and the seal cavity 108 can be equal such that seal body 404 is held in radial equilibrium.

Figure 7:
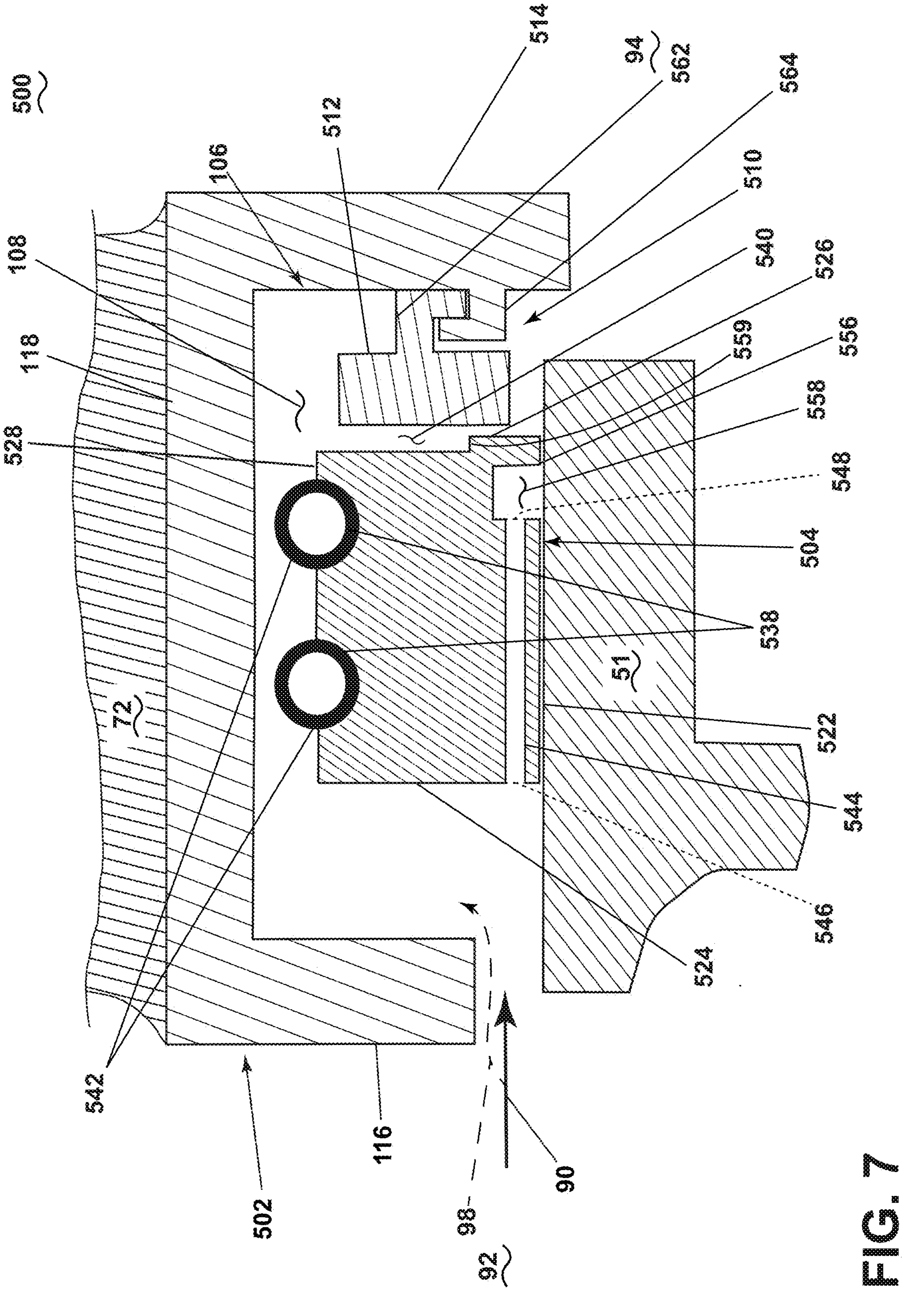
FIG. 7 is an enlarged schematic cross-sectional view an exemplary floating seal assembly of FIG. 2, further including an internal passage within the seal body, and the pivot connection formed as a lap joint.

FIG. 7 is a schematic illustration of a cross-sectional view of an exemplary floating seal assembly 500 of FIG. 2. The exemplary floating seal assembly 500 is similar to the floating seal assembly 100, 200, 300, 400; therefore, like parts will be identified with like numerals in the 500 series, with it being understood that the description of the like parts of the floating seal assembly 100, 200, 300, 400 applies to the exemplary floating seal assembly 500 unless otherwise noted.

The floating seal assembly 500 can include a seal body 504 defined by a first seal body face 522, a second seal body face 524, a third seal body face 526, and a fourth seal body face 528. The seal body 504 can further include an internal passage 544 with an inlet 546 and an outlet 548. The seal body 504 is similar to the seal body 404 in that it confronts, but does not contact the carriage assembly 102. The first seal body face 522 is similar to the first seal body face 422 in that it includes a cavity 558, and a tooth 556. The internal passage 544 can fluidly couple the inlet 546 on the second seal body face 524 to the outlet 548 fluidly coupled to the cavity 558. With the cavity 558, similar to the cavity 132, 458, the seal body 504 can axially float. The fourth seal body face 528 is similar to the fourth seal body face 228, 328, 428 in that it includes the set of grooves 538 and the set of garter springs 542. With the cavity 558 and the seal cavity 108, the seal body 504 can be held in radial equilibrium.

The floating seal assembly can further include a carriage assembly 502 is similar to the carriage assembly 102 of the floating seal assembly 100 in that it does not include the internal passage 250, 350 of the floating seal assembly 200, 300. The carriage assembly can include a first wall 514, the second wall 116 and the third wall 118 interconnecting the first all 514 and the second wall 116.

A seal face 512, similar in function to the seal face 112, 412, can be located between the first wall 514 and the seal body 504. As a non-limiting example, the seal face 512 can confront the seal body 504 and be coupled, via a pivot connection 510, to the first wall 514 of the carriage assembly 502. As illustrated, the seal face 512 can include a first hook 562 corresponding to a second hook 564 of the carriage assembly 502. As a non-limiting example, the second hook 564 can be a portion of the first wall 514 that extends toward the seal face 512. The first hook 562 can fit within the second hook 564. Together, the first hook 562 and the second hook 564 can operably couple the seal face 512 to the carriage assembly 502. The first hook 562 and the second hook 564 can define the pivot connection 510 of the seal face 512. As a non-limiting example, the pivot connection 510 can be defined as a lap joint. The seal face 512 can confront the seal body 504. As a non-limiting example, the seal face 512 can confront the fourth seal body face 528 of the seal body 504. The pivot connection 510 can allow for the seal face 512 to follow the movement of the seal body 504 during operation of the gas turbine engine 10. As such, the seal body 504 can pivot about the pivot connection 510 of the seal face 512.

The seal body 504 can further include a pressurization cavity or channel 540 similar in function to the pressurization channel 440 and the fluid cavity 140. The pressurization channel 540, however, is formed along a portion of the seal body 504 rather than the seal face 512. As a non-limiting example, the pressurization channel 540 is formed along a portion of the third seal body face 526. The pressurization channel 540, similar to the pressurization channel 440, can extend from a radially outer portion confronting the seal cavity 108 to a radially inner portion, opposite the radially outer portion, formed by a portion of the tooth 556. As such, during operation of the gas turbine engine 10, the second film of fluid can be formed between the seal body 504 and the seal face 512. With the pressurization channel 540, the seal body 504 can radially float and be held in axial equilibrium. The pressurization channel 540 can be included within a set of pressurization cavities 540 circumferentially spaced about the seal body 504. Alternatively, the pressurization channel 540 can be formed as a continuous pressurization channel 540.

Figure 8:
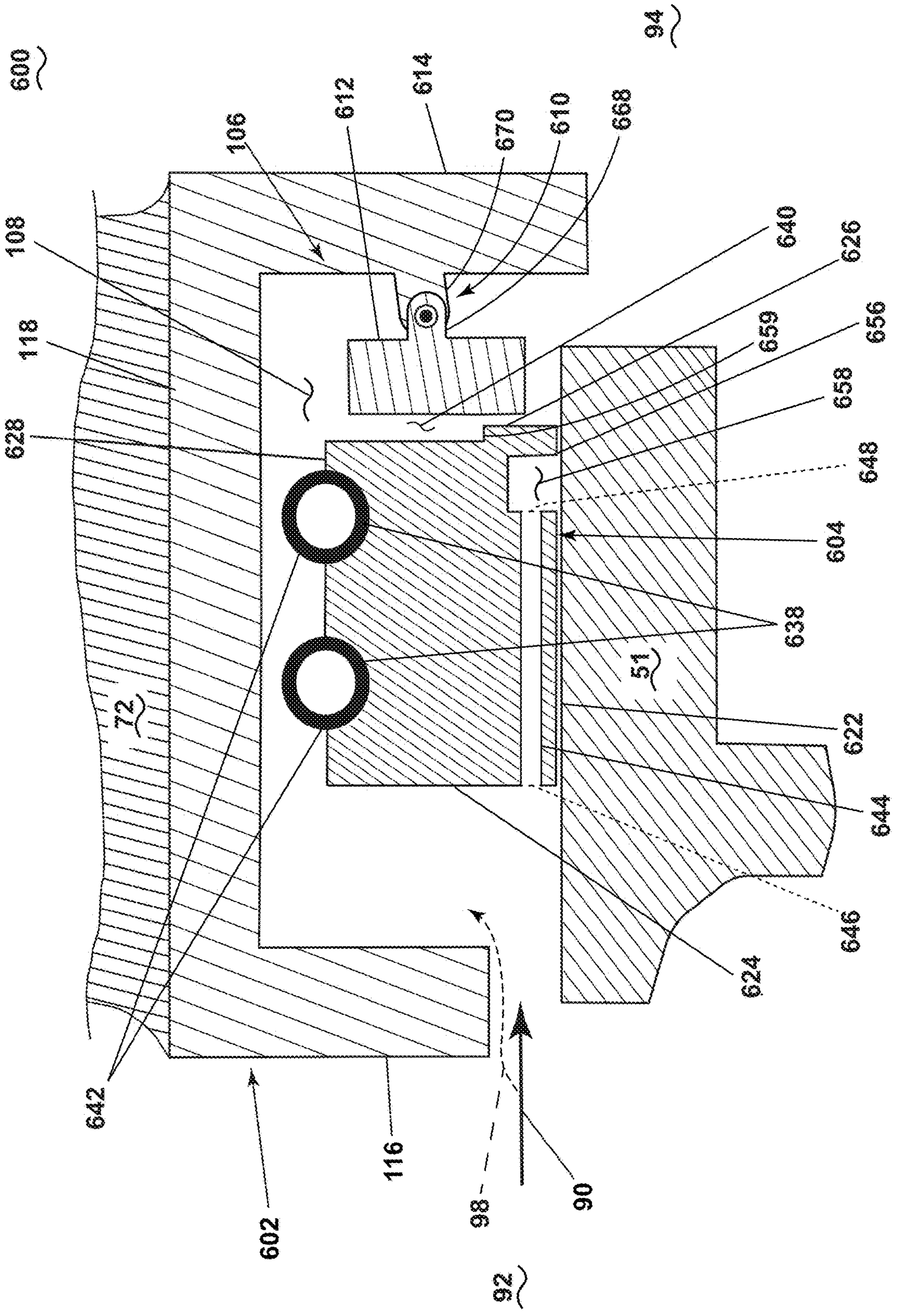
FIG. 8 is an enlarged schematic cross-sectional view an exemplary floating seal assembly of FIG. 2, further including an internal passage within the seal body, and the pivot connection formed as a hinge.

FIG. 8 is a schematic illustration of a cross-sectional view of an exemplary floating seal assembly 600 of FIG. 2. The exemplary floating seal assembly 600 is similar to the floating seal assembly 100, 200, 300, 400, 500; therefore, like parts will be identified with like numerals in the 600 series, with it being understood that the description of the like parts of the floating seal assembly 100, 200, 300, 400, 500 applies to the exemplary floating seal assembly 600 unless otherwise noted.

The floating seal assembly 600 can include a seal body 604 defined by a first seal body face 622, a second seal body face 624, a third seal body face 626, and a fourth seal body face 628. The seal body 604 can further include an internal passage 644 fluidly coupling an inlet 646 to an outlet 648. The seal body 604 is similar to the seal body 404, 504 in that it is confronts but does not contact the carriage assembly 102. The first seal body face 622 is similar to the first seal body face 422, 522 in that it includes a cavity 658, and a tooth 656. The internal passage 644 can fluidly couple the inlet 646 on the second seal body face 624 to the outlet 648 fluidly coupled to the cavity 658. With the cavity 658, similar to the cavity 132, 458, 558, the seal body 604 can axially float. The fourth seal body face 628 is similar to the fourth seal body face 228, 328, 428, 528 in that it includes the set of grooves 638 and the set of garter springs 642. With the cavity 658 and the seal cavity 108, the seal body 604 can be held in radial equilibrium.

The floating seal assembly 600 can further include a carriage assembly 602 similar to the carriage assembly 102, 502 in that it does not include the internal passage 250, 350 of the floating seal assembly 200, 300. The carriage assembly 602 can include a first wall 614, the second wall 116 and the third wall 118 interconnecting the first all 614 and the second wall 116.

The seal face 612 confronts or directly contacts the seal body 604, and is operably coupled to the carriage assembly 602, similar to the seal face 512. As a non-limiting example, the seal face 612 can be operably coupled to the first wall 614 of the carriage assembly 602. The seal face 612 can further include a first hinge 668 while the carriage assembly 602 can further include a corresponding second hinge 670. As a non-limiting example, the first hinge 668 can be opposite the portion of the seal face 612 that confronts the seal body 604, while the second hinge 670 can be a portion of the second wall 116 of the carriage assembly 602. The first hinge 668 and the second hinge 670 can interface with each other, or otherwise be operably coupled with one another, so as to form the pivot connection 610. As such, the pivot connection 610 can be defined as a hinge connection. The hinge connection can include any suitable hinge such as, but not limited to, a living hinge, a mechanical hinge, or any combination thereof. With the pivot connection 610, the seal face 612 can operate similar to the seal face 512 such that the seal face 612 can confront the seal body 604 and follow the movement of the seal body 604 during operation of the gas turbine engine 10. As such, the seal body 604 can pivot about the pivot connection 610.

The seal body 604 can further include a pressurization cavity or channel 640, similar in function to the pressurization channel 440, 540 and the fluid cavity 140. The pressurization channel 640 can extend in the radial direction along a portion of the seal body 604 from a radially inner portion defined by the tooth 656 to a radially outer portion, opposite the radially inner portion. As a non-limiting example, the pressurization channel 640 can extend in the radial direction along the third seal body face 626 and confront at least a portion of the seal face 612.

Figure 9:
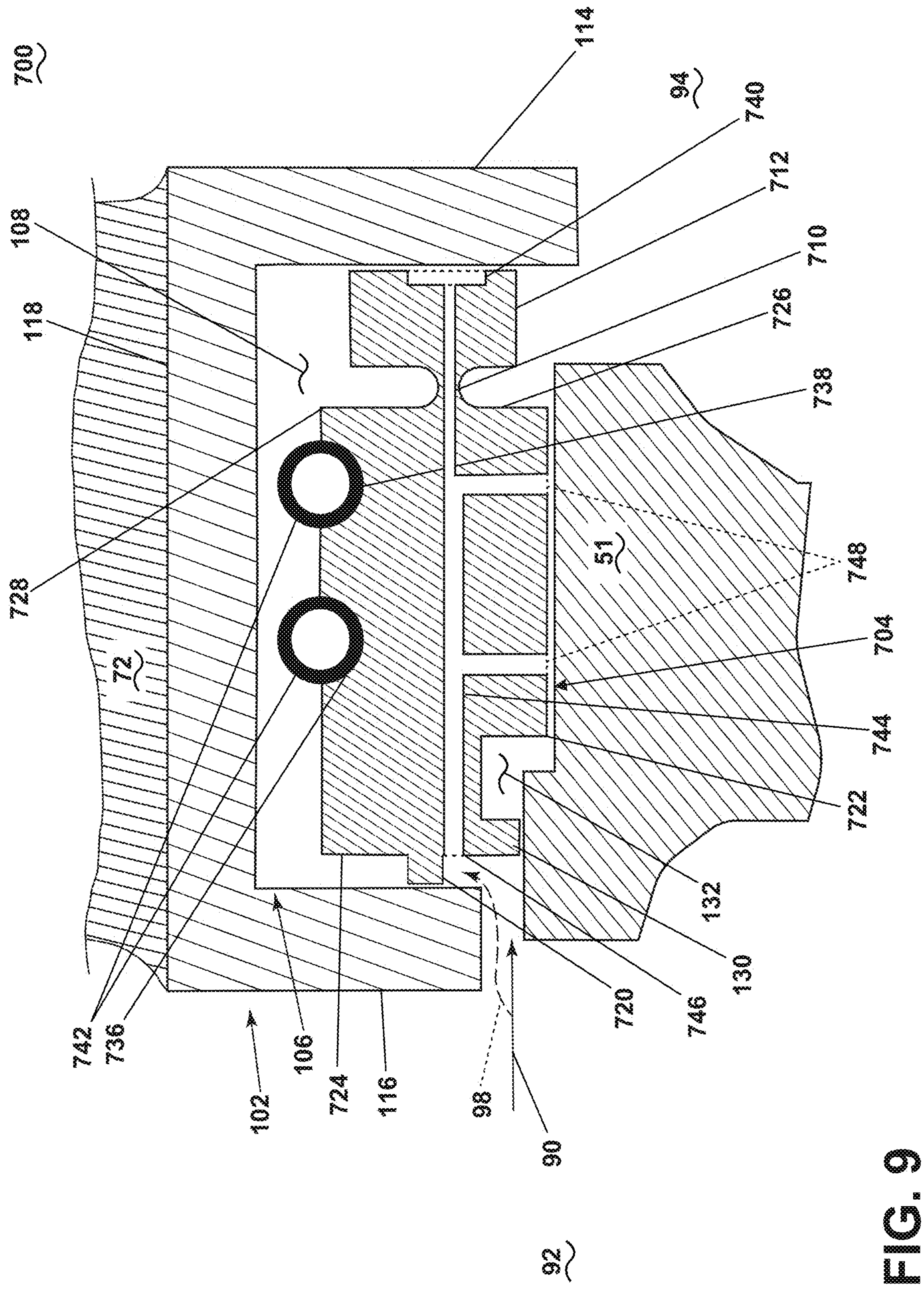
FIG. 9 is an enlarged schematic cross-sectional view exemplary floating seal assembly of FIG. 2, further including an internal passage within the seal body, the seal face, and the pivot connection.

FIG. 9 is a schematic illustration of a cross-sectional view of an exemplary floating seal assembly 700 of FIG. 2. The exemplary floating seal assembly 700 is similar to the floating seal assembly 100, 200, 300, 400, 500, 600; therefore, like parts will be identified with like numerals in the 700 series, with it being understood that the description of the like parts of the floating seal assembly 100, 200, 300, 400, 500, 600 applies to the exemplary floating seal assembly 700 unless otherwise noted.

The floating seal assembly 700 can include a seal body 704 defined by a first seal body face 722, a second seal body face 724, a third seal body face 726, and a fourth seal body face 728. The seal body 704 can further include an internal passage 744 with an inlet 746 and a set of outlets 748. The first seal body face 722 is similar to the first seal body face 222 in that at least a portion of the outlets 748 are provided along a portion of the first seal body face 722 confronting the rotor 51. The outlets 748 on the first seal body face 722 can be used to provide radial equilibrium across the seal body 704 and to generate the first film of fluid to axially float the seal body 704. The second seal body face 724 is similar to the second seal body face 224, 324 as it includes a seal tooth 720. The fourth seal body face 728 is similar to the fourth seal body face 228, 328, 428, 528, 628 in that it includes the set of grooves 738 and the set of garter springs 742.

The floating seal assembly 700 can further include a seal face 712 located between the seal body 704 and the carriage assembly 102. The seal face 712 is similar to the seal face 112 in that it includes a pivot connection 710 operably coupling the seal face 712 to the seal body 704. The seal face 712 can further include the set of fluid cavities 740 (of which only one is shown) confronting the carriage assembly 102. As a non-limiting example, the set of fluid cavities 740 can confront the first wall 114.

The internal passage 744 can fluidly couple the inlet 746 to the set of outlets 748. The inlet 746 can be located along a portion of the seal body 704 exposed to the first pressure 92 and the leakage fluid 90. As a non-limiting example, the inlet 746 can be located along a portion of the second seal body face 724. At least a portion of the internal passage 744 can extend through a portion of the seal face 712. As a non-limiting example, the internal passage 744 can extend through the pivot connection 710 and into the body of the seal face 712. At least a portion of the outlets 748 can be fluidly coupled to the set of fluid cavities 740. As such, the set of fluid cavities 740 can be fluidly coupled to the leakage fluid 90 or another fluid defined by the first pressure 92 through the internal passage 744.

During operation of the gas turbine engine 10, at least a portion of the leakage fluid 90 can flow into the set of fluid cavities 740 through the internal passage 744. The fluid within the set of fluid cavities 740 can be defined by the first pressure 92 such that the pressure of the fluid impinging the second seal body face 724 is equal to the fluid within the set of fluid cavities 740 and impinging a portion of the carriage assembly 102 (e.g., the first wall 114). As such, the seal body 704 can be held in axial equilibrium. Further, the fluid within the set of fluid cavities 740 can produce the second film of fluid between the seal face 712 and the carriage assembly 102 such that the seal body 704 can radially float as discussed herein.

Figure 10:
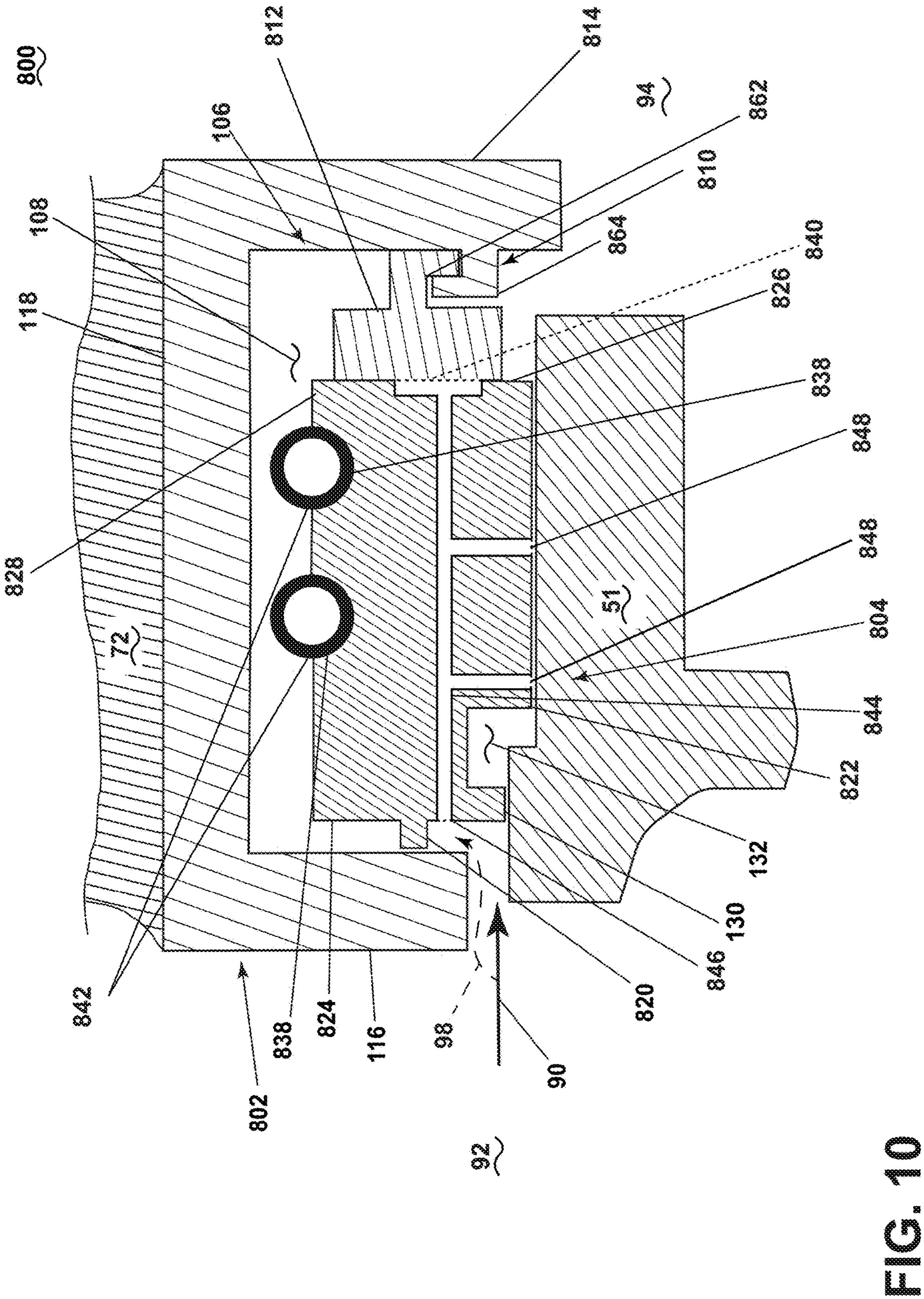
FIG. 10 is an enlarged schematic cross-sectional view an exemplary floating seal assembly of FIG. 2, further including an internal passage within the seal body, and the pivot connection formed as a lap joint, the internal passage exhausting to a counterbore confronting the seal face.

FIG. 10 is a schematic illustration of a schematic illustration of a cross-sectional view of an exemplary floating seal assembly 800 of FIG. 2. The exemplary floating seal assembly 800 is similar to the floating seal assembly 100, 200, 300, 400, 500, 600, 700; therefore, like parts will be identified with like numerals in the 800 series, with it being understood that the description of the like parts of the floating seal assembly 100, 200, 300, 400, 500, 600, 700 applies to the exemplary floating seal assembly 800 unless otherwise noted.

The floating seal assembly 800 can include a seal body 804 defined by a first seal body face 822, a second seal body face 824, a third seal body face 826, and a fourth seal body face 828. The seal body 804 can further include an internal passage 844 with an inlet 846 and a set of outlets 848. The first seal body face 822 is similar to the first seal body face 222, 722 in that at least a portion of the outlets 848 are provided along a portion of the first seal body face 822 confronting the rotor 51. The outlets 848 on the first seal body face 822 can be used to provide radial equilibrium across the seal body 804 and to generate the first film of fluid to axially float the seal body 804. The second seal body face 824 is similar to the second seal body face 724 in that the inlet 846 is provided along a portion of the second seal body face 824 exposed to the first pressure 92. The second seal body face 824 is further similar to the second seal body face 224, 324, 724 as it includes a seal tooth 820. The fourth seal body face 828 is similar to the fourth seal body face 228, 328, 428, 528, 628, 728 in that it includes the set of grooves 838 and the set of garter springs 842.

The floating seal assembly 800 can further include a carriage assembly 802 defined by a first wall 814, the second wall 116, and the third wall 118. The carriage assembly 802 is similar to the carriage assembly 502 in that it includes a second hook 864. As a non-limiting example, the first wall 814 can include the second hook 864.

The floating seal assembly 800 can further include a seal face 812 located between the seal body 804 and the carriage assembly 102. The seal face 812 is similar to the seal assembly 512 as it includes a first hook 862 extending from a portion of the seal face 812 opposite the seal body 804. The first hook 862 corresponds to and fits within the second hook 864. The first hook 862 and the corresponding second hook 864 can together define a pivot connection 810 as a lap joint. Although the lap joint is illustrated, it will be appreciated that the pivot connection 810 can be any suitable pivot connection such as the hinge connection of the pivot connection 610.

The seal body 804 can further include a fluid cavity 840, similar in function to the set of fluid cavities 140, 740 with the only difference being that the fluid cavity 840 is formed within a portion of the seal body 804 and confront the seal face 812. As a non-limiting example, the fluid cavity 840 can extend in the radial direction along the third seal body face 826 and confront at least a portion of the seal face 812. The fluid cavity 840 can be included within a set of fluid cavities 840 circumferentially spaced about the seal body 804. Alternatively, the fluid cavity 840 can be formed as a continuous fluid cavity 840. At least a portion of the outlets 848 can be located along a portion of the fluid cavity 840. As such, the fluid cavity 840 can be fluidly coupled to the leakage fluid 90 or another fluid defined by the first pressure 92 through the internal passage 844.

During operation of the gas turbine engine 10, at least a portion of the leakage fluid 90 can flow into the fluid cavity 840 through the internal passage 844. The fluid within the fluid cavity 840 can be defined by the first pressure 92 such that the pressure of the fluid impinging the second seal body face 824 is equal to the fluid within the fluid cavity 840. As such, the seal body 804 can be held in axial equilibrium. Further, the fluid within the fluid cavity 840 can produce the second film of fluid between the seal face 812 and the seal body 804 such that the seal body 804 can radially float as discussed herein.

Figure 11:
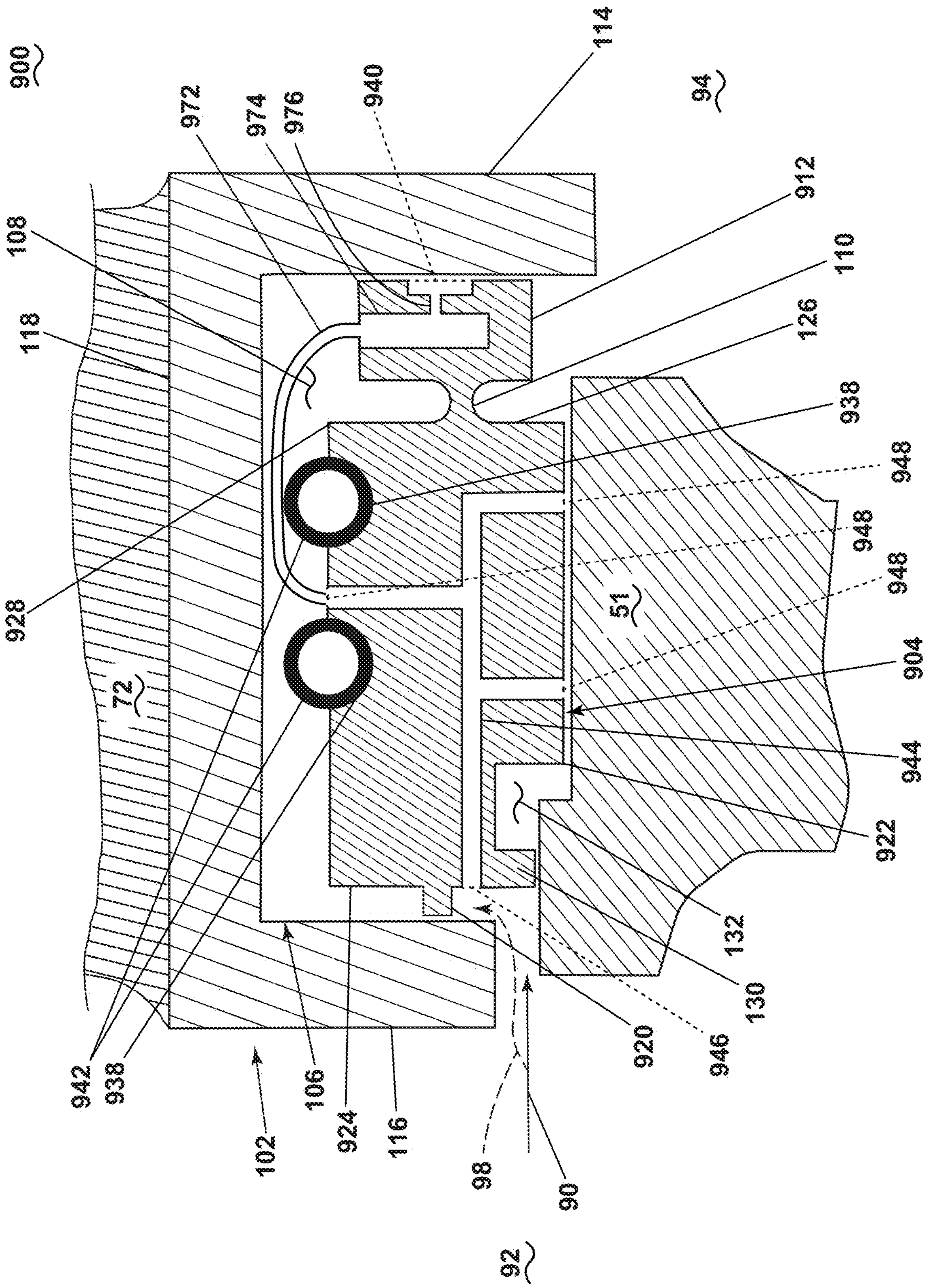
FIG. 11 is an enlarged schematic cross-sectional view an exemplary floating seal assembly of FIG. 2, further including an internal passage within the seal body, and a plenum within the seal face, with a tube fluidly coupling the internal passage to the plenum.

FIG. 11 is a schematic illustration of a cross-sectional view of an exemplary floating seal assembly 900 of FIG. 2. The exemplary floating seal assembly 900 is similar to the floating seal assembly 100, 200, 300, 400, 500, 600, 700, 800; therefore, like parts will be identified with like numerals in the 900 series, with it being understood that the description of the like parts of the floating seal assembly 100, 200, 300, 400, 500, 600, 700, 800 applies to the exemplary floating seal assembly 900 unless otherwise noted.

The floating seal assembly 900 can include a seal body 904 defined by a first seal body face 922, a second seal body face 924, the third seal body face 126, and a fourth seal body face 928. The seal body 904 can further include an internal passage 944 with an inlet 946 and a set of outlets 948. The first seal body face 922 is similar to the first seal body face 222, 722, 822 in that at least a portion of the outlets 948 are provided along a portion of the first seal body face 922 confronting the rotor 51. The outlets 948 on the first seal body face 922 can be used to provide radial equilibrium across the seal body 904 and to generate the first film of fluid to axially float the seal body 904. The second seal body face 924 is similar to the second seal body face 724, 824, in that the inlet 946 is provided along a portion of the second seal body face 924 exposed to the first pressure 92. The second seal body face 924 is further similar to the second seal body face 224, 324, 724, 824 as it includes a seal tooth 920. The fourth seal body face 928 is similar to the fourth seal body face 228, 328, 428, 528, 628, 728, 828 in that it includes the set of grooves 938 and the set of garter springs 942.

At least portion of the internal passage 944 can extend toward radially outer portions of the seal body 904. As a non-limiting example, at least a portion of the outlets 948 can be formed on the fourth seal body face 928 opposite the first seal body face 922.

A seal face 912 can be located between the seal body 904 and the carriage assembly 102. As a non-limiting example, the seal face 912 can confront the carriage assembly 102 and be coupled to the seal body 904 through the pivot connection 110. The seal face 912 further include a plenum 974 formed within the body of the seal face 912. As illustrated, the plenum 974 can extend radially within the seal face 912. The plenum 974 can be fluidly coupled to the set of fluid cavities 940 through a passage 976 formed between the plenum 974 and the set of fluid cavities 940. The plenum 974 can be formed as a continuous plenum along the circumferential extent of the seal face 912, or the plenum 974 can be included within a set of circumferentially spaced plenums 974. A tube 972 can extend through a portion of the seal cavity 108. The tube 972 can fluidly couple at least some of the outlets 948 located along the fourth seal body face 928 to the plenum 974, which is ultimately fluidly coupled to the set of fluid cavities 940. As such, the tube 972 can fluidly couple the internal passage 944 within the seal body 904 to the plenum 974 and ultimately to the set of fluid cavities 940. Through the internal passage 944, the tube 972, the plenum 974, and the passage 976, the set of fluid cavities 940 can be fluidly coupled to the leakage fluid 90 or any other fluid defined by the first pressure 92. This, in turn, allows for the generation of axial equilibrium and the second film of fluid. The tube 972 can be formed as any suitable tube 972 such as, but not limited to, a rubber hose, or a metal conduit.

Figure 12:
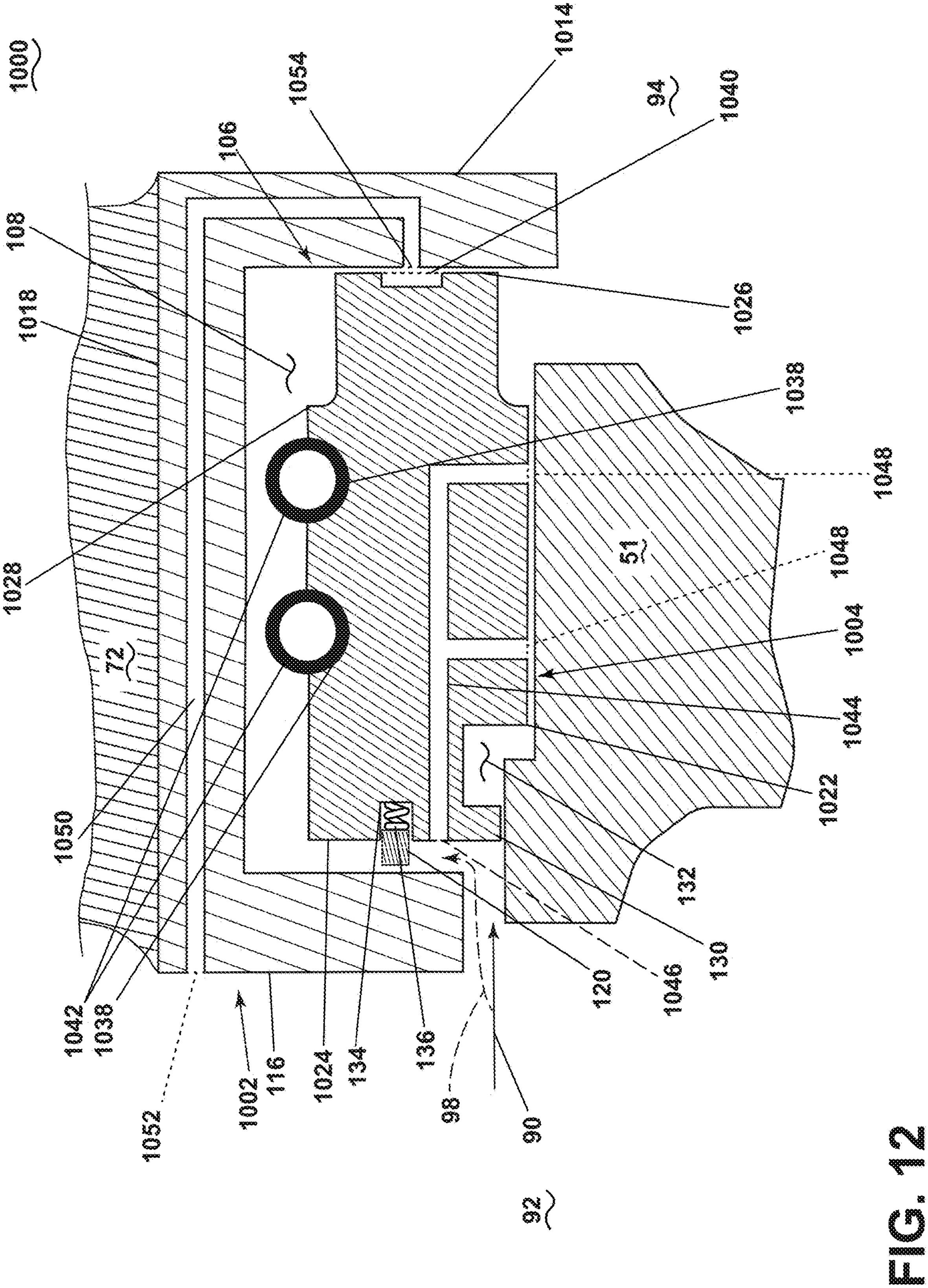
FIG. 12 is an enlarged schematic cross-sectional view an exemplary floating seal assembly of FIG. 2, further including a first internal passage within the carriage assembly, a second internal passage within the seal body, and the seal with a spring biasing the seal against the carriage assembly.

FIG. 12 is a schematic illustration of a cross-sectional view of an exemplary floating seal assembly 1000 of FIG. 2. The exemplary floating seal assembly 1000 is similar to the floating seal assembly 100, 200, 300, 400, 500, 600, 700, 800, 900; therefore, like parts will be identified with like numerals in the 1000 series, with it being understood that the description of the like parts of the floating seal assembly 100, 200, 300, 400, 500, 600, 700, 800, 900 applies to the exemplary floating seal assembly 1000 unless otherwise noted.

The floating seal assembly 1000 is similar to the floating seal assembly 100, 200, 300, 400, 500, 600, 700, 800, 900, except that the floating seal assembly 1000 does not include the seal face or the pivot connection like the floating seal assembly 100, 200, 300, 400, 500, 600, 700, 800, 900 does. It will be appreciated, however, that the floating seal assembly 1000 can include any suitable seal face and pivot connection as discussed herein.

The floating seal assembly 1000 can include a seal body 1004 defined by a first seal body face 1022, a second seal body face 1024, a third seal body face 1026, and a fourth seal body face 1028. The seal body 1004 can further include a first internal passage 1044 with an inlet 1046 and a set of outlets 1048. The first seal body face 1022 is similar to the first seal body face 222, 722, 822, 922 in that at least a portion of the outlets 1048 are provided along a portion of the first seal body face 1022 confronting the rotor 51. The outlets 1048 on the first seal body face 1022 can be used to provide radial equilibrium across the seal body 1004 and to generate the first film of fluid to axially float the seal body 1004. The second seal body face 1024 is similar to the second seal body face 724, 824, 924, in that the inlet 1046 is provided along a portion of the second seal body face 1024 exposed to the first pressure 92. The second seal body face 1024 is further similar to the second seal body face 1024 as it includes the seal 120, the seal groove 134, and the biasing element 136 defining the piston seal. The third seal body face 1026 is similar to the third seal body face 826 in that it includes a fluid cavity 1040. The fluid cavity 1040 can be used to provide axial equilibrium across the seal body and to generate the second film of fluid to radially float the seal body 1004. The fourth seal body face 1028 is similar to the fourth seal body face 228, 328, 428, 528, 628, 728, 828, 928 in that it includes the set of grooves 1038 and the set of garter springs 1042.

The floating seal assembly 1000 can further include a carriage assembly 1002 similar to the carriage assembly 202 in that it includes a second internal passage 1050 at least partially formed within a portion of a first wall 1014 and a portion of a third wall 1018. The carriage assembly 1002 can further include the second wall 116 with the third wall 1018 interconnecting the second wall 116 and the first wall 1014.

The second internal passage 1050 can fluidly couple an inlet 1052 located on a portion of the carriage assembly 1002 exposed to the first pressure 92, to an outlet 1054 located on a portion of the carriage assembly 1002 confronting the seal cavity 108. As a non-limiting example, the fluid cavity 1040 can confront the first wall 1014 and the outlet 1054 can be located along a portion of the first wall 1014 corresponding to the fluid cavity 1040. As such, the fluid cavity 1040 can be fluidly coupled to the outlet 1054, which is fluidly coupled to the inlet 1052 exposed to the first pressure 92. As such, the fluid cavity 1040 can be used to provide axial equilibrium across the seal body and to generate the second film of fluid to radially float the seal body 1004.

Figure 13:
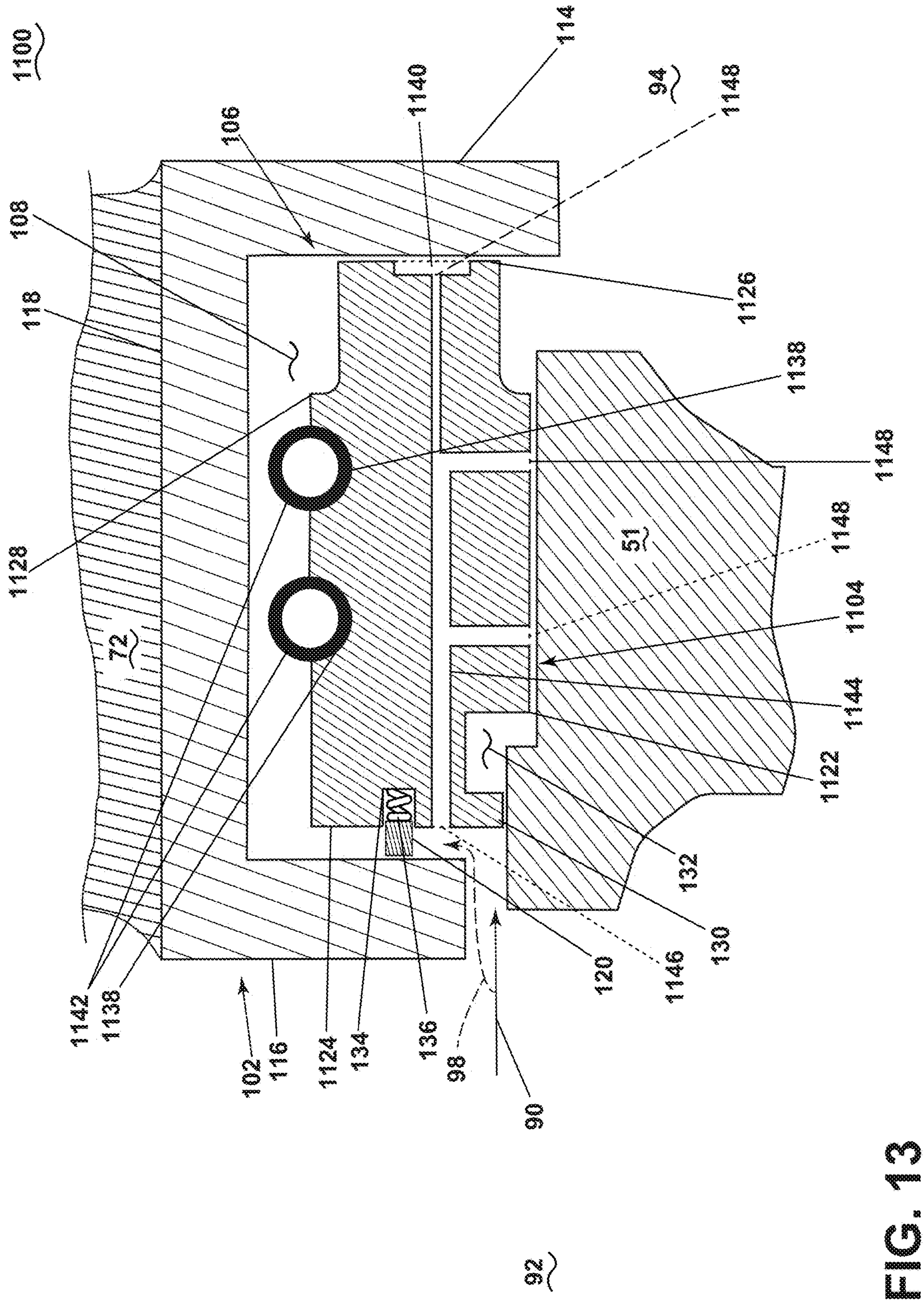
FIG. 13 is an enlarged schematic cross-sectional view an exemplary floating seal assembly of FIG. 2, further including an internal passage formed within the seal body, and the seal with a spring biasing the seal against the carriage assembly.

FIG. 13 is a schematic illustration of a cross-sectional view of an exemplary floating seal assembly 1100 of FIG. 2. The exemplary floating seal assembly 1100 is similar to the floating seal assembly 100, 200, 300, 400, 500, 600, 700, 800, 900, 1000; therefore, like parts will be identified with like numerals in the 1100 series, with it being understood that the description of the like parts of the floating seal assembly 100, 200, 300, 400, 500, 600, 700, 800, 900, 1000 applies to the exemplary floating seal assembly 1100 unless otherwise noted.

The floating seal assembly 1100 is similar to the floating seal assembly 1000 in that the floating seal assembly 1100 does not include the seal face or the pivot connection like the floating seal assembly 100, 200, 300, 400, 500, 600, 700, 800, 900 does. It will be appreciated, however, that the floating seal assembly 1100 can include any suitable seal face and pivot connection as discussed herein.

The floating seal assembly 1100 can include a seal body 1104 defined by a first seal body face 1122, a second seal body face 1124, a third seal body face 1126, and a fourth seal body face 1128. The seal body 1104 can further include an internal passage 1144 fluidly coupling an inlet 1146 to a set of outlets 1148. The first seal body face 1122 is similar to the first seal body face 222, 722, 822, 922, 1022 in that at least a portion of the outlets 1148 are provided along a portion of the first seal body face 1122 confronting the rotor 51. The outlets 1148 on the first seal body face 1122 can be used to provide radial equilibrium across the seal body 1104 and to generate the first film of fluid to axially float the seal body 1104. The second seal body face 1124 is similar to the second seal body face 724, 824, 924, 1024 in that the inlet 1146 is provided along a portion of the second seal body face 1124 exposed to the first pressure 92. The third seal body face 1126 is similar to the third seal body face 826 in that it includes a fluid cavity 1140. The third seal body face 1126 is similar to the third seal body face 826 in that the fluid cavity 1140 can be fluidly coupled to at least a portion of the outlets 1148, which are fluidly coupled to the inlet 1146 exposed to the first pressure 92. The fluid cavity 1140 can be used to provide axial equilibrium across the seal body and to generate the second film of fluid to radially float the seal body 1104. The fourth seal body face 1128 is similar to the fourth seal body face 228, 328, 428, 528, 628, 728, 828, 928, 1028 in that it includes the set of grooves 1138 and the set of garter springs 1142.

Figure 14:
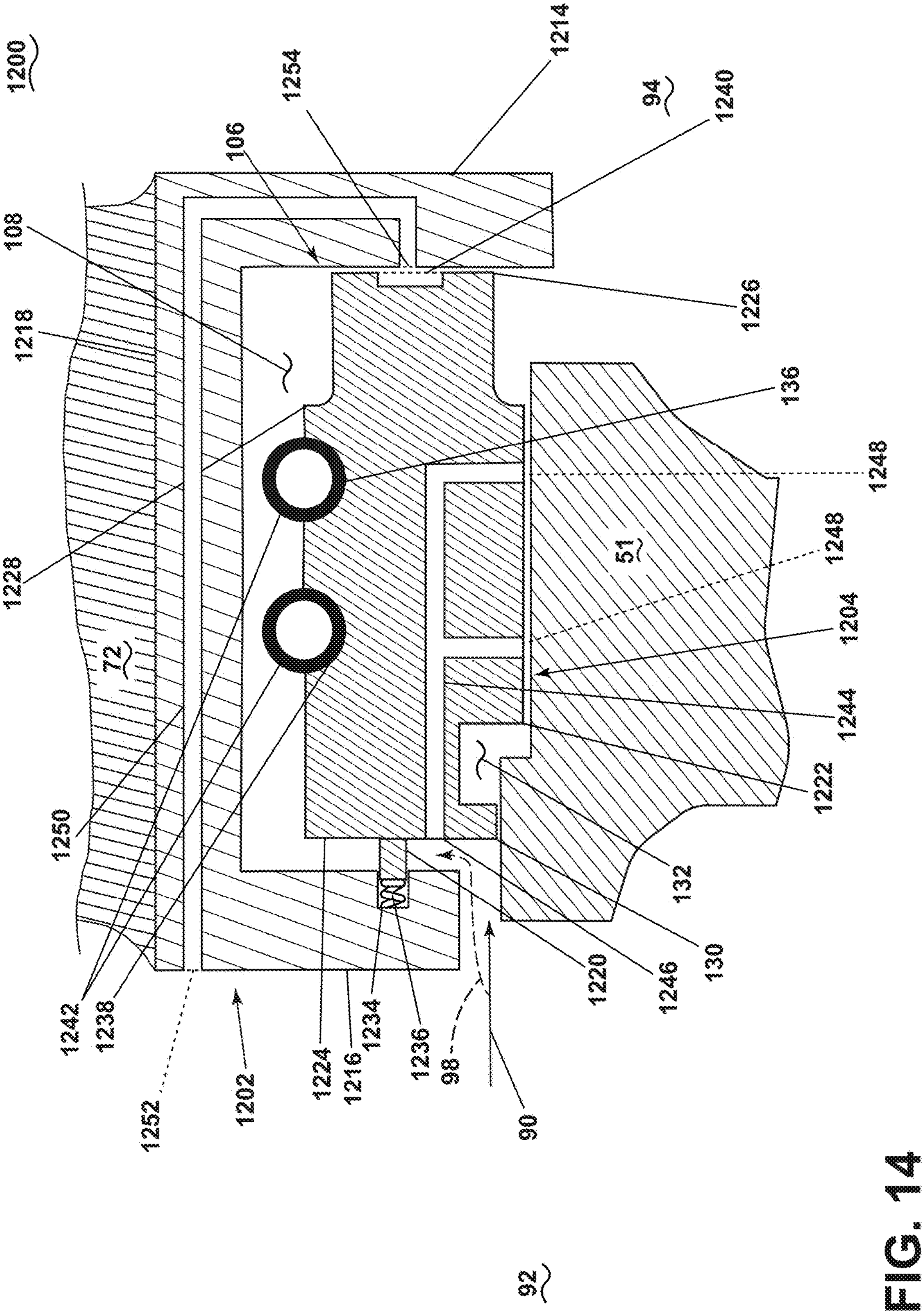
FIG. 14 is an enlarged schematic cross-sectional view an exemplary floating seal assembly of FIG. 2, further including an internal passage formed within the seal body, and the seal with a spring biasing the seal against the seal body.

FIG. 14 is a schematic illustration of a cross-sectional view of an exemplary floating seal assembly 1200 of FIG. 2. The exemplary floating seal assembly 1200 is similar to the floating seal assembly 100, 200, 300, 400, 500, 600, 700, 800, 900, 1000, 1100; therefore, like parts will be identified with like numerals in the 1200 series, with it being understood that the description of the like parts of the floating seal assembly 100, 200, 300, 400, 500, 600, 700, 800, 900, 1000, 1100 applies to the exemplary floating seal assembly 1200 unless otherwise noted.

The floating seal assembly 1200 is similar to the floating seal assembly 1000, 1100 in that the floating seal assembly 1200 does not include the seal face or the pivot connection like the floating seal assembly 100, 200, 300, 400, 500, 600, 700, 800, 900 does. It will be appreciated, however, that the floating seal assembly 1200 can include any suitable seal face and pivot connection as discussed herein.

The floating seal assembly 1200 can include a seal body 1204 defined by a first seal body face 1222, a second seal body face 1224, a third seal body face 1226, and a fourth seal body face 1228. The seal body 1204 can further include an internal passage 1244 with an inlet 1246 and a set of outlets 1248. The first seal body face 1222 is similar to the first seal body face 222, 722, 822, 922, 1022, 1122 in that at least a portion of the outlets 1248 are provided along a portion of the first seal body face 1222 confronting the rotor 51. The outlets 1248 on the first seal body face 1222 can be used to provide radial equilibrium across the seal body 1204 and to generate the first film of fluid to axially float the seal body 1204. The second seal body face 1224 is similar to the second seal body face 724, 824, 924, 1024, 1124 in that the inlet 1246 is provided along a portion of the second seal body face 1224 exposed to the first pressure 92. The third seal body face 1226 is similar to the third seal body face 826, 1026, 1126 in that it includes a fluid cavity 1240. The fourth seal body face 1228 is similar to the fourth seal body face 228, 328, 428, 528, 628, 728, 828, 928, 1028, 1128 in that it includes the set of grooves 1238 and the set of garter springs 1242.

The floating seal assembly 1200 can further include a carriage assembly 1202 defined by a first wall 1214, a second wall 1216, and a third wall 1218. The first wall 1214 and the third wall 1218 are similar to the first wall 214, 314, 1014 and the third wall 218, 318, 1018 in that they at least partially define a second internal passage 1250 that fluidly couples an inlet 1252 to an outlet 1254. The inlet 1252 can be located on a portion of the carriage assembly 1202 exposed to the first pressure 92, while the outlet 1254 can be located on a portion of the carriage assembly (e.g., the first wall 1214). The outlet 1254 can be fluidly coupled to the fluid cavity 1240 of the seal body 1204. As such, the fluid cavity 1240 can be used to provide axial equilibrium across the seal body and to generate the second film of fluid to radially float the seal body 1204.

A seal 1220 at least partially received within a seal groove 1234 and including a biasing element 1236 can be included within a portion of the carriage assembly 1202 and confront the seal body 1204. As a non-limiting example, the seal groove 1234 can be formed within a portion of the second wall 1216 such that the seal 1220 extends from the second wall 1216 and toward the seal body 1204. The seal 1220 is similar to the seal 120 in that it is a piston seal, however, the only difference is that it is partially received within the seal groove 1234 formed within the carriage assembly 1202 and not the seal body 1204.

Figure 15:
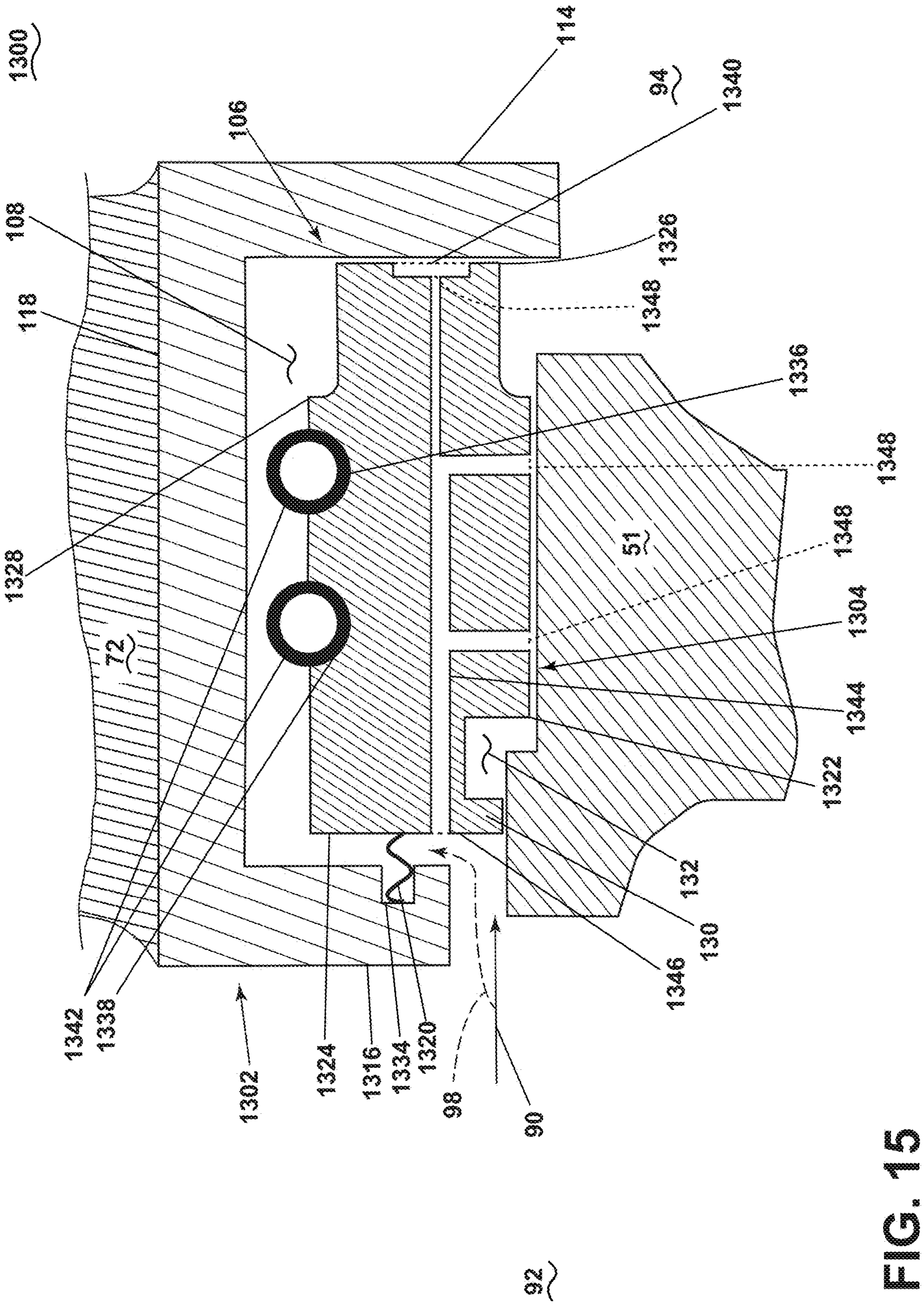
FIG. 15 is an enlarged schematic cross-sectional view an exemplary floating seal assembly of FIG. 2, further including an internal passage formed within the seal body, and the seal formed as a W-seal.

FIG. 15 is a schematic illustration of a cross-sectional view of an exemplary floating seal assembly 1300 of FIG. 2. The exemplary floating seal assembly 1300 is similar to the floating seal assembly 100, 200, 300, 400, 500, 600, 700, 800, 900, 1000, 1100, 1200; therefore, like parts will be identified with like numerals in the 1300 series, with it being understood that the description of the like parts of the floating seal assembly 100, 200, 300, 400, 500, 600, 700, 800, 900, 1000, 1100, 1200 applies to the exemplary floating seal assembly 1300 unless otherwise noted.

The floating seal assembly 1300 is similar to the floating seal assembly 1000, 1100, 1200 in that the floating seal assembly 1300 does not include the seal face or the pivot connection like the floating seal assembly 100, 200, 300, 400, 500, 600, 700, 800, 900 docs. It will be appreciated, however, that the floating seal assembly 1300 can include any suitable seal face and pivot connection as discussed herein.

The floating seal assembly 1300 can include a seal body 1304 defined by a first seal body face 1322, a second seal body face 1324, a third seal body face 1326, and a fourth seal body face 1328. The seal body 1304 can further include an internal passage 1344 with an inlet 1346 and a set of outlets 1348. The first seal body face 1322 is similar to the first seal body face 222, 722, 822, 922, 1022, 1122, 1222 in that at least a portion of the outlets 1348 are provided along a portion of the first seal body face 1322 confronting the rotor 51. The outlets 1348 on the first seal body face 1322 can be used to provide radial equilibrium across the seal body 1304 and to generate the first film of fluid to axially float the seal body 1304. The second seal body face 1324 is similar to the second seal body face 724, 824, 924, 1024, 1124, 1224 in that the inlet 1346 is provided along a portion of the second seal body face 1324 exposed to the first pressure 92. The third seal body face 1326 is similar to the third seal body face 826, 1026, 1126, 1226 in that it includes a fluid cavity 1340. The third seal body face 1326 is further similar to the third seal body face 1326 in that at least a portion of the outlets 1348 can be fluidly coupled to the fluid cavity 1340. The fluid cavity 1340 can be used to provide axial equilibrium across the seal body and to generate the second film of fluid to radially float the seal body 1304. The fourth seal body face 1328 is similar to the fourth seal body face 228, 328, 428, 528, 628, 728, 828, 928, 1028, 1128, 1228 in that it includes the set of grooves 1338 and the set of garter springs 1342.

The floating seal assembly 1300 can further include a carriage assembly 1302 defined by the first wall 114, a second wall 1316, and the third wall 118. The second wall 1316, like the second wall 1216, can include a seal groove 1334. A seal 1320 at least partially received within the seal groove 1334 can be included within a portion of the carriage assembly 1302 and confront the seal body 1304. As a non-limiting example, the seal groove 1334 can be formed within a portion of the second wall 1316 such that the seal 1320 extends from the second wall 1316 and toward the seal body 1304. The seal 1320, as illustrated, is formed as a W-seal at least partially received within the seal groove 1334 and extending across the gap between the carriage assembly 1302 and the seal body 1304. It is contemplated that the either end of the W-seal can be coupled to respective portions of the seal body 1304 or the carriage assembly 1302 through inherent contact caused spring-biased position of the seal 1320 (e.g., the opposite ends of the seal 1320 are biased against the carriage assembly 1302 and the seal body 1304) and pressure-loading across the seal 1320. The W-seal can expand and contract based on the positioning of the seal body 1304. As such, the seal 1320 can follow the movement of the seal body 1304 during operation of the gas turbine engine 10. Further yet, although the seal groove 1334 is illustrated to be included within the carriage assembly 1302, it will be appreciated that the seal groove 1334 can also be included within the seal body 1304. It is yet further contemplated that the seal groove 1334 can be at least partially defined by both the seal body 1304 and the carriage assembly 1302.

Figure 16:
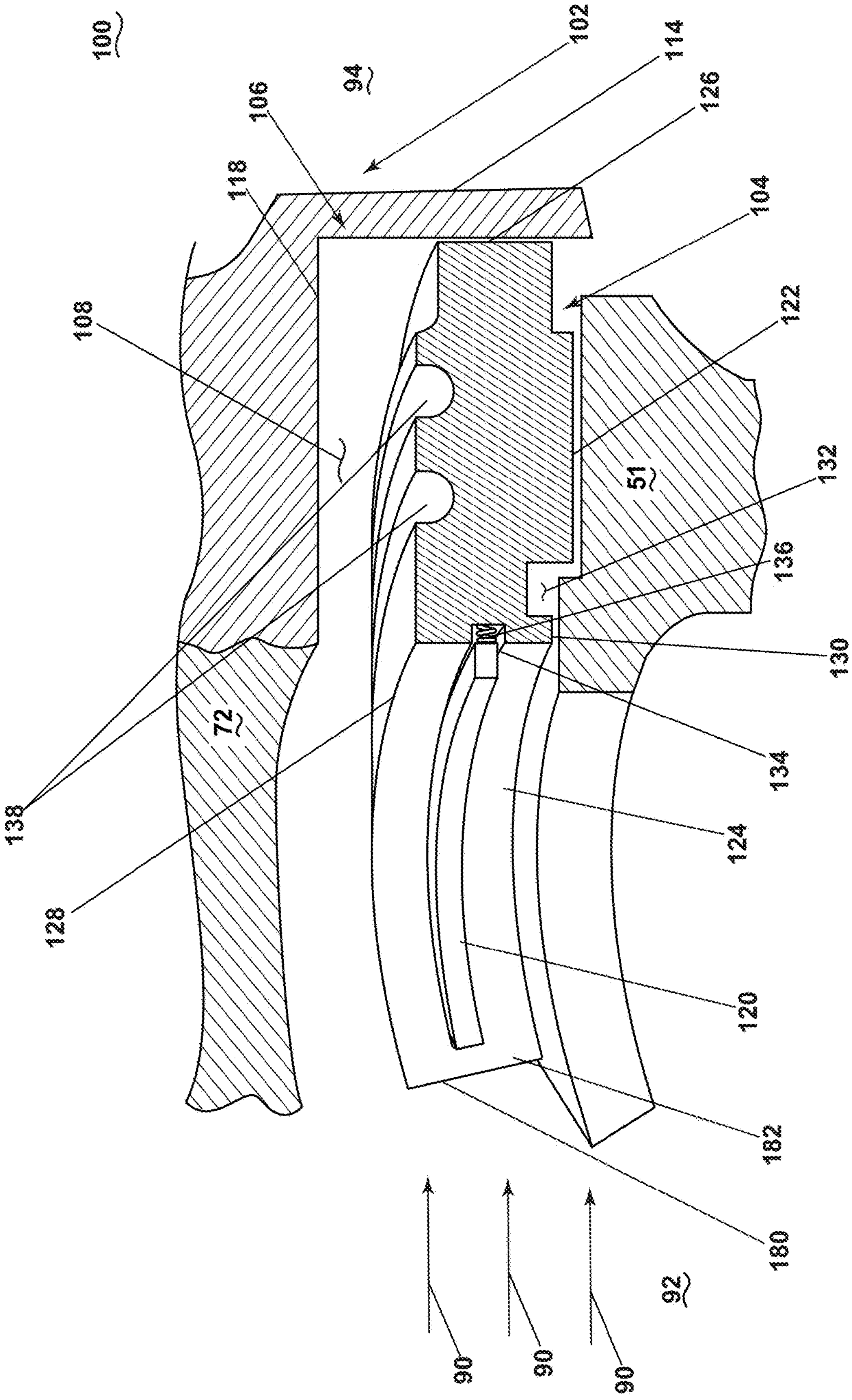
FIG. 16 is schematic perspective view of the floating seal assembly of FIG. 2, further including a seal dam.

FIG. 16 is schematic perspective view of the floating seal assembly 100 of FIG. 2, further including a seal dam 182. Although described in terms of the floating seal assembly 100, it will be appreciated that the aspects described herein can be applied to any of the suitable floating seal assemblies described herein. The carriage assembly 102, as illustrated, is cut so as to illustrate the seal 120 provided along the second seal body face 124.

As illustrated, the seal body 104 can extend circumferentially about the rotor 51 and follow the outer circumference or curvature of the rotor 51. In some cases, however, the seal body 104 extends across only a portion of the rotor 51 or the engine centerline 12. In other words, the seal body 104 can be included within a set of seal bodies 104 that are segmented about the engine centerline 12. In such a case, the seal body 104 can extend from one circumferentially distal end 180 to another, circumferentially opposed distal end 180 (not illustrated). Adjacent seal bodies 104 can meet at their circumferentially distal ends 180. As a non-limiting example, adjacent seal bodies 104 can include an intersegment gap separating the distal end 180 of one seal body 104 from an adjacent distal end 180 of an adjacent seal body 104. Alternatively, the seal body 104 can be formed as a single seal body 104 that extends around the entirety of the engine centerline 12 (FIG. 1) and completely envelopes the rotor 51. The carriage assembly 102 can be segmented or otherwise formed as a single unitary piece extending about the entirety of the engine centerline 12.

As illustrated, the seal 120, the seal groove 134 and the biasing element 136 can extend circumferentially along at least a portion of the seal body 104. Near the distal ends 180, the seal body 104 can be include the seal dam 182. The seal dam 182 can demarcate the circumferentially distal portions of the seal 120. In other words, the seal dam 182 indicates the end of the circumferential extend of the seal 120. As illustrated, the seal 120 and seal groove 134 can be arcuit or otherwise formed as circular arcs that follow the curvature of the seal body 104 and/or the rotor 51. As such, the seal 120 can be defined as an arcuit seal 120 and the groove 134 can be defined as an arcuit groove 134. It will be appreciated, however, that the seal 120, the seal groove 134, or the biasing element 136 can be formed as any suitable shape that either does or does not correspond to the curvature of the seal body 104 and/or the rotor 51. As a non-limiting example, that the seal 120, the seal groove 134, the biasing element 136 can be formed as a linear (e.g., straight) shape from one distal end 180 to the other distal end 180, or as an arcuit shape corresponding to the curvature of the rotor 51.

Figure 17:
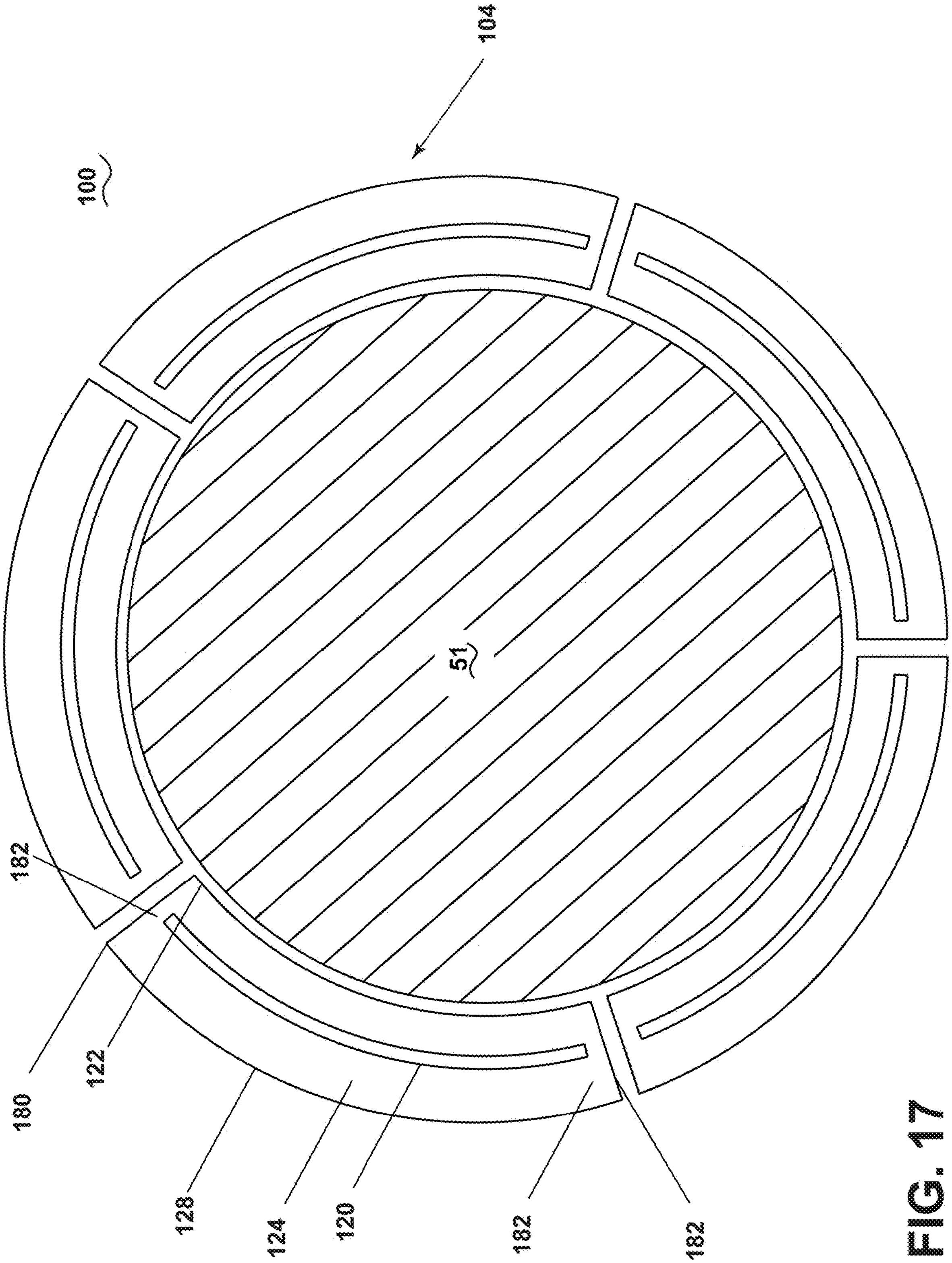
FIG. 17 is schematic cross-sectional view of the floating seal assembly of FIG. 16, further including a set of segmented seal bodies circumferentially spaced with respect to one another.

FIG. 17 is schematic cross-sectional view of the floating seal assembly 100 of FIG. 16. The illustration is a schematic representation of the floating seal assembly 100 as seen from a plane normal to the second seal body face 124. It will be appreciated that the carriage assembly 102 has been removed for illustration purposes. Although described in terms of the floating seal assembly 100, it will be appreciated that the aspects described herein can be applied to any of the suitable floating seal assemblies described herein.

As illustrated, the seal body 104 is included within the set of seal bodies 104 that are circumferentially located about the rotor 51. Each seal body 104 can extend between circumferentially opposed and spaced distal ends 180. As illustrated, the set of seal bodies 104 can span across the entire of the rotor 51 by placing five seal bodies 104 adjacent one another. It will be appreciated, however, that the floating seal assembly 100 can include any number of one or more seal bodies 104. In all cases, however, the floating seal assembly 100 spans circumferentially across the entire of the rotor 51 and the engine centerline 12 (FIG. 1). As illustrated, each seal body 104 includes a corresponding seal 120 received within a corresponding seal groove 134 (FIG. 16). As a non-limiting example, the seal groove 134 can be provided either in the seal body 104 or along a portion of the carriage assembly 102 as described herein. Each seal 120 can extend between the respective seal dams 182 of the seal bodies 104.

Figure 18:
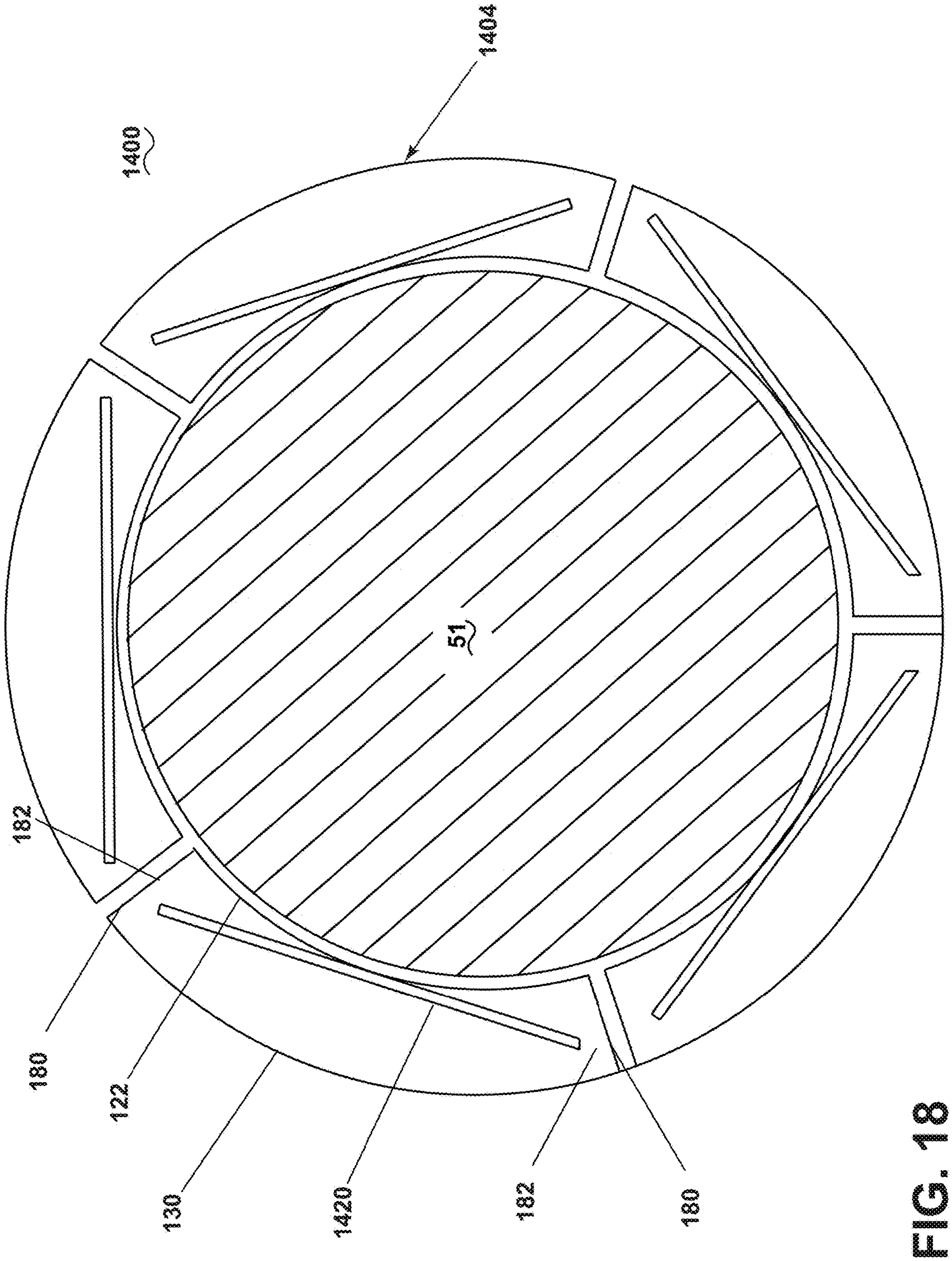
FIG. 18 is schematic cross-sectional view of an exemplary floating seal assembly of FIG. 2, further including a set of segmented seal bodies circumferentially spaced with respect to one another, with the seal formed as a linear seal.

FIG. 18 is schematic cross-sectional view of an exemplary floating seal assembly 1400 of FIG. 2. The exemplary floating seal assembly 1400 is similar to the floating seal assembly 100, 200, 300, 400, 500, 600, 700, 800, 900, 1000, 1100, 1200, 1300; therefore, like parts will be identified with like numerals in the 1400 series, with it being understood that the description of the like parts of the floating seal assembly 100, 200, 300, 400, 500, 600, 700, 800, 900, 1000, 1100, 1200, 1300 applies to the exemplary floating seal assembly 1400 unless otherwise noted.

The floating seal assembly 1400 can include a seal 1420 similar to the seal 120 (FIG. 3A). The seal 1420, however, can be any suitable seal 1420 as discussed herein. Further yet, the floating seal assembly 1400 is illustrated to include a set of seal bodies 1404 similar to the floating seal assembly 100 illustrated in FIGS. 16-17. It will be appreciated, however, that the set of seal bodies 1404 can include any number of one or more seal bodies 1404 circumferentially spaced with respect to one another. As a non-limiting example, the set of seal bodies 1404 can include a single seal body 1404 extending across the entire circumference of the rotor 51 and the engine centerline 12.

As illustrated, the seal 1420 can be included within a set of seals 1420 similar to the set of seals 120 of FIG. 17. Each seal 1420, as illustrated, extends linearly from one distal end 180 of the seal body 1404 to another, circumferentially opposite distal end 180 of the same seal body 1404. As a non-limiting example, the seal 1420 can be defined as a linear seal 1420 that terminates near the distal ends 180 of the seal body 1404 through which the seal 1420 extends. The seal 1420 can terminate just prior to the distal end 180 such that the space between the distal ends of the seal 1420 and the corresponding distal end 180 of the seal body 1404 can be defined by the seal dam 182. This arrangement can reduce the manufacturing costs and burden as the seal 1420, and the seal groove in which it is placed within does not need to be manufactured to follow the curvature of the seal body 1404. This, in turn, ensures that a minimal amount of the leakage fluid 90 can enter the corresponding seal cavities or otherwise flow around the stator 63.

It will be appreciated that the each of the seals 1420 can extend linearly through each corresponding seal body 1404. Alternatively, at least one of the seals 1420 can extend non-linearly, while the remainder of the seals 1420 extend linearly. As a non-limiting example, one of the seal bodies 1404 can include the seal 120, which extends across the seal body 1404 while following the curvature of the seal body 1404 or the outer circumference of the rotor 51, and another seal body 1404 can include the linearly extending seal 1420. It will be further appreciated that the seal 1420 (or the seal 120) can extend through the entirety of one seal body 1404 and at least a portion of an adjacent seal body 1404. In other words, the seal 1420 can extend through a distal end 180 of the seal body 1404, into the distal end 180 of another adjacent seal body 1404, and through at least a portion of the seal body 1404. As such, a single seal 1420 can be used to seal more than one seal body 1404. As a non-limiting example, a single seal 1420 can circumscribe the rotor 51 such that the seal 1420 forms a continuous seal 1420 about the periphery of the rotor 51 and extends through the circumferential entirety of each seal body 1404. In either case, the seal 1420 can be formed linearly or non-linearly, and follow any polygonal, or circular path about the periphery of the rotor 51 and through the seal bodies 1404. This arrangement can ensure that multiple, discrete seals 1420 are not needed to be formed within each seal body 1404, thus reducing the manufacturing costs and burden if each seal body 1404 included its own seal 1420. This arrangement can further ensure that the entirety of the circumference of the rotor includes a seal 1420. This, in turn, ensures that a minimal amount of the leakage fluid 90 can enter the corresponding seal cavities or otherwise flow around the stator 63.

Benefits of the present disclosure include the floating seal assembly with an increased sealing capability when compared to conventional rotor seal assemblies (e.g., seal assemblies located between a stator and a rotor, similar in location to the floating seal assemblies as described herein). For example, conventional rotor seal assemblies can rely on creating a labyrinth between the stator and the rotor by extending components from the rotor (e.g., teeth that extend from the rotor). The space between the components from the rotor and the stator ultimately determine the effectiveness of the floating seal assembly from limiting or preventing the leakage fluid from passing through the rotor-stator gap. This space is only scalable by locating the stationary components of the floating seal assembly closer to the components extending from the rotor. Conventional labyrinth seals also have limited capability for leakage control based on seal diameter, vibratory response, and other factors. A labyrinth seal tooth to stator (usually honeycomb abradable) sealing gap or clearance can only be held so tight in a gas turbine engines operation, generally to a physical gap of 4 to 100 mils, depending on the seal size and location. The floating seal assembly as described herein, however, can establish the radial and axial equilibriums across the seal body through use of the internal passages (within the carriage and/or the seal body). The equilibriums ensure that the seal body is held near the rotor during all operations of the gas turbine engine and that the sealing components do not lose their sealing capabilities as the rotor moves. The equilibriums can be obtained through the implementation of the internal passages. This, in turn, increases the sealing effectiveness when compared to traditional floating seal assemblies.

Further benefits of the present disclosure include a floating seal assembly with a greater flexibility in movement when compared to conventional rotor seal assemblies. For example, conventional rotor seal assemblies can include a static portion and the components extending from the rotor (e.g., the finger seals), as described in the previous section, to create the labyrinth to limit the amount of leakage fluid that can flow around the stator. During operation, however, the rotor can translate axially or radially causing the components extending from the rotor to come into contact with the static portion of the floating seal assembly. This ultimately results in a greater amount of wear or fatigue on the floating seal assembly as these portions are coming into contact with one another and further results in greater frictional forces within the turbine engine. The increased wear can result in a decreased sealing capability over time as the floating seal assembly is worn down and the space between the rotor and the static portions of the floating seal assembly increases, thus allowing a greater amount of leakage fluid to pass. The increased frictional forces and the increased wear ultimately reduce the overall performance of the turbine engine. The floating seal assembly, as described herein, however, includes component within the carriage assembly (e.g., the internal passage), the seal body (e.g., the internal passage, the pressurization cavity, the set of outlets, the cavity, the secondary cavity), and/or the seal face (e.g., the set of fluid cavities, the pressurization cavities) that create or otherwise interact with the first film of fluid and the second film of fluid. The first film of fluid and the second film of fluid can each define regions of low-friction or low-resistance such that the seal body can float over the rotor, the seal face, or the carriage assembly. The floating allows the seal body to easily and accurately follow the movement of the rotor in a comparatively low friction state (e.g., compared to conventional rotor seal assemblies) with the carriage assembly, the seal face, or the rotor. This ultimately reduces the wear of the floating seal assembly and decreases the overall frictional forces generated between the seal assembly and the carriage assembly, and the seal assembly and the rotor. The reduced wear can increase the lifespan of the floating seal assembly and the sealing capabilities of the floating seal assembly, while the reduced frictional forces can ultimately increase the efficiency of the turbine engine when compared to conventional turbine engines including the conventional rotor seal assemblies.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A turbine engine comprising an engine core comprising at least a compressor section and a turbine section in axial flow arrangement defining an axially extending, engine centerline, and arranged as a rotor and a stator, and a floating seal assembly, sealing at least portions of the rotor and the stator relative to a higher-pressure area and a lower-pressure area, comprising a carriage assembly having a first wall exposed to the lower-pressure area, the carriage assembly carried by the stator, with the first wall at least partially defining a seal seat with a seal cavity, a seal body floating within the seal cavity, a seal face located between the seal body and the first wall, and a pivot connection coupling the seal face to one of the seal body or the first wall.

The turbine engine of any preceding clause, wherein the pivot connection and the seal face are integrally formed with the seal body, and the seal face confronts the first wall, and wherein the seal face further comprises a set of fluid cavities confronting one of the first wall or the seal body.

The turbine engine of any preceding clause, further comprising an internal passage located in at least one of seal body or the carriage assembly and fluidly connecting the higher-pressure area to the fluid cavities on the seal face.

The turbine engine of any preceding clause, further comprising a plenum provided within a portion of the seal face and fluidly coupled to at least one of the fluid cavities The turbine engine of any preceding clause, further comprising a tube fluidly coupling the internal passage to the plenum.

The turbine engine of any preceding clause, wherein at least one of the seal body or the seal face comprises a pressurization channel confronting the first wall or the seal face, respectively, with at least a portion of the pressurization channel being exposed to the seal cavity.

The turbine engine of any preceding clause, wherein the pivot connection is at least one of a mechanical hinge, a living hinge, an elastic member, a lap joint, or a bellows.

The turbine engine of any preceding clause, wherein the floating seal assembly is provided within the turbine section, and the carriage assembly includes a second wall, upstream the first wall and exposed to the higher-pressure area, with the first wall and the second wall at least partially defining the seal seat.

The turbine engine of any preceding clause, wherein the seal body further comprises a tooth extending radially inwardly from the seal body and confronting the rotor, with the tooth including a first side exposed to high-pressure area, and a cavity confronting the rotor and provided on a second side, opposite the first side, of the tooth.

The turbine engine of any preceding clause, wherein the pivot connection is included within a set of segmented pivot connections.

A turbine engine comprising an engine core comprising at least a compressor section, and a turbine section in axial flow arrangement defining an axial direction and an engine centerline, the engine core further having a rotor and a stator, and a floating seal assembly, sealing at least portions of the rotor and the stator relative to a higher-pressure area and a lower-pressure area, comprising: a carriage assembly having a first wall exposed to the lower-pressure area and a second wall exposed to the higher-pressure area, the carriage assembly carried by the stator, with the first wall and the second wall at least partially defining a seal with a seal cavity, a seal body floating within the seal cavity, and including a seal body face confronting the second wall, and a seal located between the seal body and the second wall, the seal being biased against at least one of the second wall or the seal body face to limit or stop an ingress of a leakage fluid into the seal cavity.

The turbine engine of any preceding clause, further comprising a seal groove formed within one of the second wall or the seal body face, and a spring biasing the seal against one of the second wall or the seal body face.

The turbine engine of any preceding clause, wherein the seal is at least one of a W-seal, a piston ring, a piston bar, a leaf spring, a spline seal, a segmented piston ring, an E-seal, or a C-seal.

The turbine engine of any preceding clause, wherein the seal body and the seal are segmented about the engine centerline.

The turbine engine of any preceding clause, further comprising a seal dam located on circumferentially distal ends of the floating seal assembly.

The turbine engine of any preceding clause, wherein the seal body is segmented about the engine centerline, and the seal is formed as a linear seal.

The turbine engine of any preceding clause, wherein the floating seal assembly is provided within the turbine section, and the first wall is upstream the second wall.

A turbine engine comprising an engine core comprising at least a compressor section, and a turbine section in axial flow arrangement defining an axial direction and an engine centerline, the engine core further having a rotor and a stator, and a floating seal assembly, sealing at least portions of the rotor and the stator relative to a higher-pressure area and a lower-pressure area, comprising a carriage assembly having a first wall exposed to the lower pressure and a second wall exposed to the higher pressure, the carriage assembly carried by the stator, with the first wall and the second wall at least partially defining a seal seat with a seal cavity, a seal body floating within the seal cavity, and including a seal body face confronting the second wall, a seal located between the seal body and the second wall, the seal being biased against at least one of the second wall or the seal body face to limit or stop an ingress of a leakage fluid into the seal cavity, a seal face located between the seal body and the first wall, and a pivot connection coupling the seal face to one of the seal body or the first wall.

The turbine engine of any preceding clause, wherein the pivot connection is at least one of a mechanical hinge, a living hinge, an elastic member, a lap joint, or a bellows.

The turbine engine of any preceding clause, further comprising a set of fluid cavities formed within the seal face and confronting the first wall, and an internal passage located in at least one of the seal body or the carriage assembly and fluidly connecting the higher-pressure area to the fluid cavities on the seal face, wherein the pivot connection and the seal face are integrally formed with the seal body, and the seal face confronts the second wall, and wherein the seal body is segmented about the engine centerline, and the seal is either formed as at least one of a linear seal or an arcuit seal and can be at least one of segmented, or continuous about the engine centerline.

What is claimed is:

1. A floating seal assembly for a turbine engine having a rotor and a stator, the floating seal assembly comprising:

a carriage assembly having a wall, the carriage assembly carried by the stator, with the wall at least partially defining a seal seat with a seal cavity;

a seal body floating within the seal cavity;

a seal face located between the seal body and the wall, the seal face including a secondary tooth confronting the wall and defining a pressurization channel with the wall, the pressurization channel being open to the seal cavity and terminating at the secondary tooth;

a cavity located along the seal body and facing a rotor face; and an internal passage having an outlet opening into the cavity;

wherein the floating seal assembly seals at least portions of the rotor and the stator relative to a higher-pressure area and a lower-pressure area of the turbine engine, wherein the seal face extends circumferentially around the seal body such that the secondary tooth and the pressurization channel extend circumferentially around the seal body.

2. The floating seal assembly of claim 1, wherein the internal passage comprises an inlet exposed to the higher-pressure area.

3. The floating seal assembly of claim 2, wherein the wall is a first wall, and the carriage assembly comprises a second wall upstream of the first wall.

4. The floating seal assembly of claim 3, wherein the inlet is located along the second wall.

5. The floating seal assembly of claim 3, wherein the outlet is located along the first wall.

6. The floating seal assembly of claim 1, wherein the seal face is formed with the seal body.

7. The floating seal assembly of claim 6, wherein the outlet is located along a portion of the carriage assembly confronting the seal face.

8. The floating seal assembly of claim 1, further comprising a pivot connection coupling the seal face to the seal body.

9. The floating seal assembly of claim 8, wherein the pivot connection and the seal face are integrally formed with the seal body.

10. The floating seal assembly of claim 8, wherein the pivot connection is included within a set of segmented pivot connections.

11. The floating seal assembly of claim 1, wherein the wall is a first wall, the carriage assembly comprises a second wall upstream of the first wall, and the seal body includes a seal body face confronting the second wall.

12. The floating seal assembly of claim 11, further comprising a seal extending between the seal body face and the second wall biased against at least one of the second wall or the seal body face to limit or stop an ingress of a leakage fluid into the seal cavity.

13. The floating seal assembly of claim 12, wherein the turbine engine has an engine centerline, and the seal extends circumferentially continuously between a first distal end and a second distal end along the seal body face, with respect to the engine centerline.

14. The floating seal assembly of claim 13, wherein:

the seal body face extends circumferentially continuously between a first seal body face distal end and a second seal body face distal end, with respect to the engine centerline; and at least one of the first distal end or the second distal end is circumferentially adjacent to and spaced from the first seal body face distal end or the second seal body face distal end, respectively, to define a seal dam therebetween.

15. The floating seal assembly of claim 13, wherein the seal extends linearly between the first distal end and the second distal end.

16. The floating seal assembly of claim 12, further comprising a seal groove formed within one of the second wall or the seal body face, and a spring biasing the seal against one of the second wall or the seal body face.

17. The floating seal assembly of claim 16, wherein the seal is at least one of a W-seal, a piston ring, a piston bar, a leaf seal, a spline seal, a segmented piston ring, an E-seal, or a C-seal.

18. The floating seal assembly of claim 1, wherein the turbine engine has an engine centerline, and at least one of the carriage assembly or the seal body is circumferentially segmented about the engine centerline.

19. The floating seal assembly of claim 1, further comprising a set of garter springs provided along a respective portion of the seal body.

20. The floating seal assembly of claim 1, wherein the turbine engine has an engine centerline and the higher-pressure area is axially forward of the lower-pressure area, with respect to the engine centerline.

* * * * *